US012789378B2

(12) United States Patent
Sawa et al.

(10) Patent No.: US 12,789,378 B2
(45) Date of Patent: Nov. 10, 2026

(54) HANDLING SYSTEM, INFORMATION PROCESSING SYSTEM, INFORMATION PROCESSING METHOD, AND STORAGE MEDIUM

(71) Applicant: Kabushiki Kaisha Toshiba, Tokyo (JP)

(72) Inventors: Kazuhide Sawa, Kawasaki (JP); Akihito Ogawa, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 71 days.

(21) Appl. No.: 18/888,244

(22) Filed: Sep. 18, 2024

(65) Prior Publication Data

US 2025/0010473 A1 Jan. 9, 2025

Related U.S. Application Data

(63) Continuation of application No. PCT/JP2023/011191, filed on Mar. 22, 2023.

(30) Foreign Application Priority Data

Mar. 23, 2022 (JP) ................................ 2022-047308

(51) Int. Cl.
*B25J 9/16* (2006.01)
*B25J 19/06* (2006.01)

(52) U.S. Cl.
CPC ........... *B25J 9/1666* (2013.01); *B25J 19/063* (2013.01)

(58) Field of Classification Search
CPC ...... B25J 9/1666; B25J 9/1612; B25J 9/1664; B25J 9/1697; B25J 19/063; B25J 13/08;
(Continued)

(56) References Cited

U.S. PATENT DOCUMENTS

2002/0117380 A1* 8/2002 Downs ................ B25J 17/0208
2014/0156066 A1 6/2014 Sakano
(Continued)

FOREIGN PATENT DOCUMENTS

EP 3 284 563 A2 2/2018
EP 3 623 115 A1 3/2020
(Continued)

OTHER PUBLICATIONS

Machine Translation of JP-2009255191-A (Year: 2009).*
(Continued)

*Primary Examiner* — Ellis B. Ramirez
(74) *Attorney, Agent, or Firm* — Oblon, McClelland, Maier & Neustadt, L.L.P.

(57) ABSTRACT

According to an embodiment, a handling system handles an object. The handling system includes a holder and a controller. The holder includes a main body operable to hold an object and an interference permitter displaceably or deformably attached to the main body. A controller is configured to control a motion of the holder. The controller is configured to plan a movement route of the holder. The controller is configured to determine the presence or absence of physical interference of the holder on at least a part of the planned movement route. The controller is configured to, as to a specific segment included in the planned movement route, determine the presence or absence of physical interference of the main body and permit physical interference of the interference permitter.

18 Claims, 15 Drawing Sheets

(58) Field of Classification Search
CPC . B25J 13/00; B25J 15/06; B25J 15/08; B65G 47/90
USPC ............ 700/253; 294/25, 86.4, 86.42, 86.16, 294/86.26; 901/10, 14, 46, 47
See application file for complete search history.

(56) References Cited

U.S. PATENT DOCUMENTS

| | | | | |
|---|---|---|---|---|
| 2018/0272535 | A1 | 9/2018 | Ogawa et al. | |
| 2019/0351549 | A1* | 11/2019 | Suzuki | B25J 15/0042 |
| 2020/0391385 | A1 | 12/2020 | Oka et al. | |
| 2023/0241767 | A1* | 8/2023 | Sodeyama | B25J 9/1633 |

FOREIGN PATENT DOCUMENTS

| | | | | | |
|---|---|---|---|---|---|
| EP | 3 711 907 | A1 | | 9/2020 | |
| EP | 3 925 910 | A1 | | 12/2021 | |
| JP | 2001105374 | A | * | 4/2001 | |
| JP | 3843319 | B2 | * | 11/2006 | |
| JP | 2009255191 | A | * | 11/2009 | |
| JP | 2010201538 | A | * | 9/2010 | B25J 9/1612 |
| JP | 2012-139806 | A | | 7/2012 | |
| JP | 2014-108466 | A | | 6/2014 | |
| JP | 2019-141987 | A | | 8/2019 | |
| JP | 6633209 | B2 | * | 1/2020 | B25J 13/08 |
| JP | 2020-40132 | A | | 3/2020 | |
| JP | 2020-151780 | A | | 9/2020 | |
| JP | 2020-203342 | A | | 12/2020 | |
| JP | 6807949 | B2 | | 1/2021 | |
| WO | WO-2018092860 | A1 | * | 5/2018 | B25J 13/00 |

OTHER PUBLICATIONS

Machine Translation of JP-2020040132-A (Year: 2020).*

German Office Action issued Oct. 20, 2025 in German Patent Application No. 112023001513.9, (with English translation), 11 pages.

International Search Report issued May 30, 2023 in PCT/JP2023/011191 filed on Mar. 22, 2023, 2 pages.

Tomita et al., "R&D on Programming-less Manipulation Systems Using Three-dimensional Vision", IPSJ Journal, vol. 44, No. SIG17 (CVIM8), Dec. 2003, 24 pages (with Machine Generated English Translation).

MoveIt, "Pick and Place Tutorial", obtained on Mar. 1, 2021, 5 pages, http://docs.ros.org/en/melodic/api/moveit_tutorials/html/doc/pick_place/pick_place_tutorial.html#pick-pipeline.

* cited by examiner

FIG. 5

354

| SEGMENT | | POSITIONAL CONTROL | MECHANICAL CONTROL | INTERFERENCE PERMISSION SETTING |
|---|---|---|---|---|
| FROM | TO | | | |
| GAP1 | GAP2 | ON | OFF | 001 |
| GAP2 | GP(GP') | ON | ON | 002 |
| GP(GP') | GPclose | OFF | ON | 003 |
| GPclose | GAP3 | ON | OFF | 003 |
| GAP3 | RAP1 | ON | OFF | 003 |
| RAP1 | RAP2 | ON | OFF | 003 |
| RAP2 | RP(RP') | ON | ON | 003 |
| RP(RP') | RPopen | OFF | ON | 003 |
| RPopen | RAP3 | ON | OFF | 002 |
| ... | ... | ... | ... | ... |

FIG. 6

356

| | | | | |
|---|---|---|---|---|
| INTERFERENCE PERMISSION SETTING 001 | | MAIN BODY | INTERFERENCE PERMITTER | ... |
| | CONTAINER | NO | NO | ... |
| | SURROUNDING ENVIRONMENT | NO | NO | ... |
| | OBJECT | NO | NO | ... |
| | ... | ... | ... | ... |
| INTERFERENCE PERMISSION SETTING 002 | | MAIN BODY | INTERFERENCE PERMITTER | ... |
| | CONTAINER | NO | YES | ... |
| | SURROUNDING ENVIRONMENT | NO | YES | ... |
| | OBJECT | NO | YES | ... |
| | ... | ... | ... | ... |
| INTERFERENCE PERMISSION SETTING 003 | | MAIN BODY | INTERFERENCE PERMITTER | ... |
| | CONTAINER | YES | YES | ... |
| | SURROUNDING ENVIRONMENT | YES | YES | ... |
| | OBJECT | YES | YES | ... |
| | ... | ... | ... | ... |
| ... | ... | ... | ... | ... |

HANDLING SYSTEM, INFORMATION PROCESSING SYSTEM, INFORMATION PROCESSING METHOD, AND STORAGE MEDIUM

CROSS-REFERENCE TO RELATED APPLICATION

Priority is claimed on Japanese Patent Application No. 2022-047308, filed Mar. 23, 2022, the content of which is incorporated herein by reference.

FIELD

Embodiments of the present invention relate to a handling system, an information processing system, an information processing method, and a storage medium.

BACKGROUND

A handling device for performing operations of picking and releasing a workpiece is known.

BRIEF DESCRIPTION OF THE DRAWINGS

FIG. 5 is a diagram showing an example of a plan table according to the embodiment.

FIG. 6 is a diagram showing an example of an interference permission setting table according to the embodiment.

DETAILED DESCRIPTION

Figure 1:
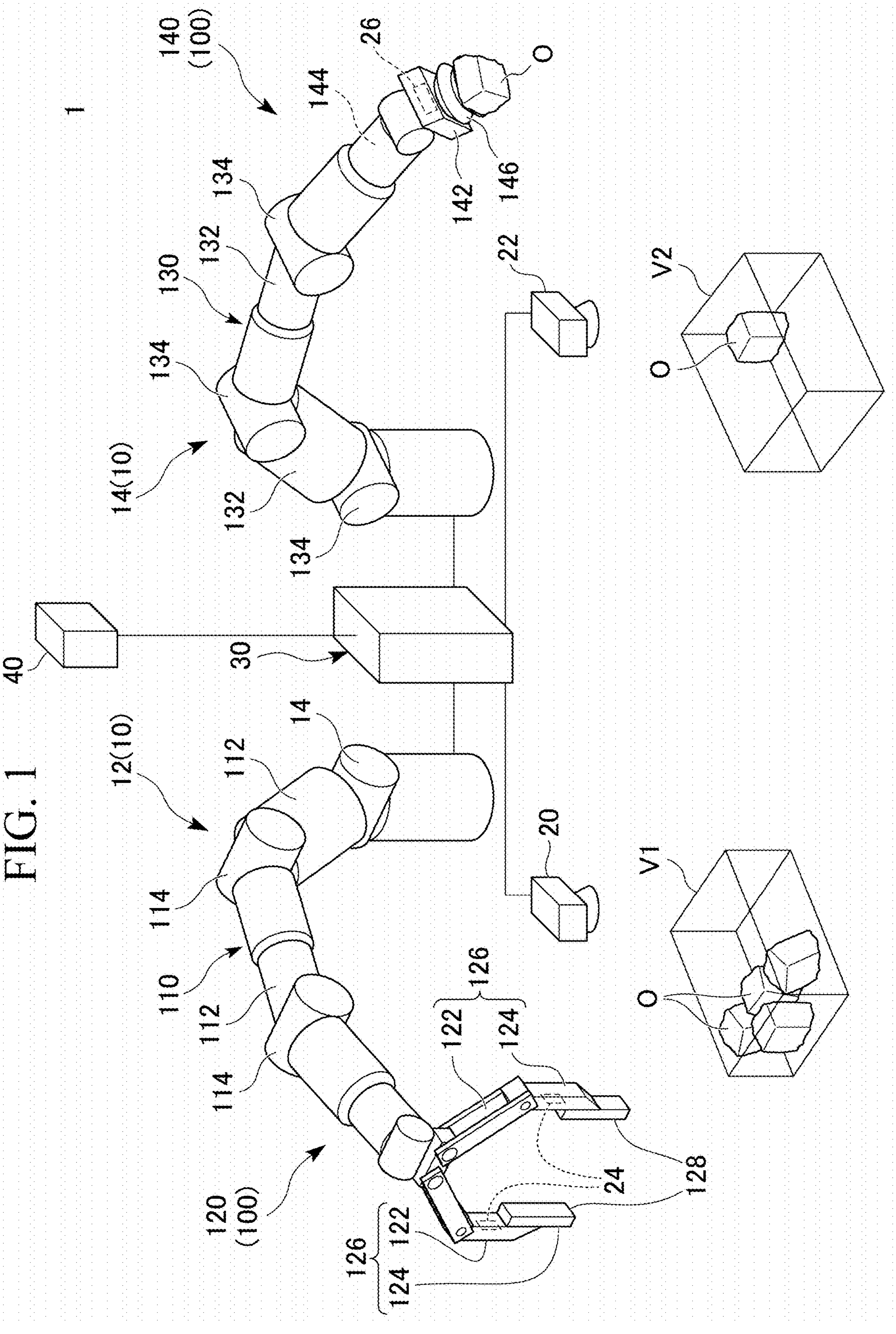
FIG. 1 is a schematic diagram showing a configuration of a handling system according to an embodiment.

According to an embodiment, a handling system handles an object. The handling system includes a holder and a controller. The holder includes a main body and an interference permitter. The main body is operable to hold the object. The interference permitter is displaceably or deformably attached to the main body. A controller is configured to control a motion of the holder. The controller is configured to plan a movement route of the holder. The controller is configured to determine the presence or absence of physical interference of the holder on at least a part of the planned movement route. The controller is configured to, as to a specific segment included in the planned movement route, determine the presence or absence of physical interference of the main body and permit physical interference of the interference permitter.

Hereinafter, a handling system, an information processing system, an information processing method, and a storage medium according to embodiments will be described with reference to the drawings. The drawings are schematically or conceptually shown and a relationship between a thickness and a width of each part, a size ratio between parts, and the like are not necessarily identical to those in reality. Moreover, even if the same parts are shown, dimensions or ratios may be differently shown according to the drawing. Moreover, XYZ coordinates shown in the drawings are defined for convenience of description and the present invention is not limited thereto.

In the present specification, the term "based on XX" means "based on at least XX" and also includes a case based on another element in addition to XX. Moreover, the term "based on XX" is not limited to a case where XX is directly used and includes a case based on a result of performing a calculation operation or processing on XX. "XX" is any element (e.g., any information).

The term "physical interference" in the present specification means, for example, the physical contact or collision of a holder of a robot with a physical object other than the holder itself (an overall device mechanism including the robot having the holder, a person, an object to be held, peripheral equipment including a table and a container, or the like) during an operation.

A handling system 1 according to an embodiment will be described with reference to FIGS. 1 to 4.

FIG. 1 is a schematic diagram showing a configuration of the handling system 1 according to the embodiment.

Figure 2:
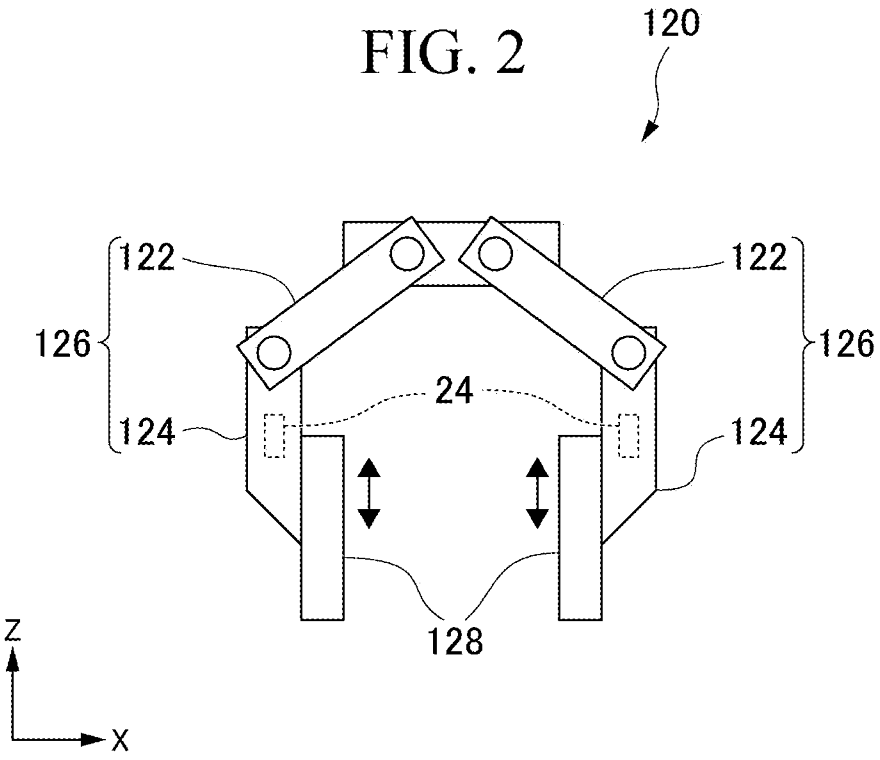
FIG. 2 is a schematic diagram showing a configuration of a pincher according to the embodiment.

FIG. 2 is a schematic diagram showing a configuration of a pincher 120 according to the embodiment.

Figure 3:
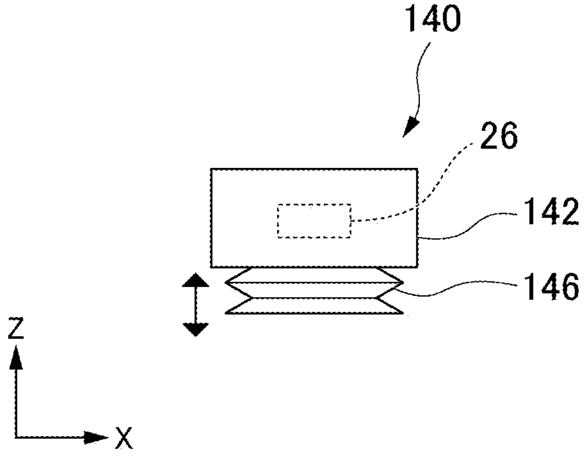
FIG. 3 is a schematic diagram showing a configuration of an adsorber according to the embodiment.

FIG. 3 is a schematic diagram showing a configuration of an adsorber 140 according to the embodiment.

Figure 4:
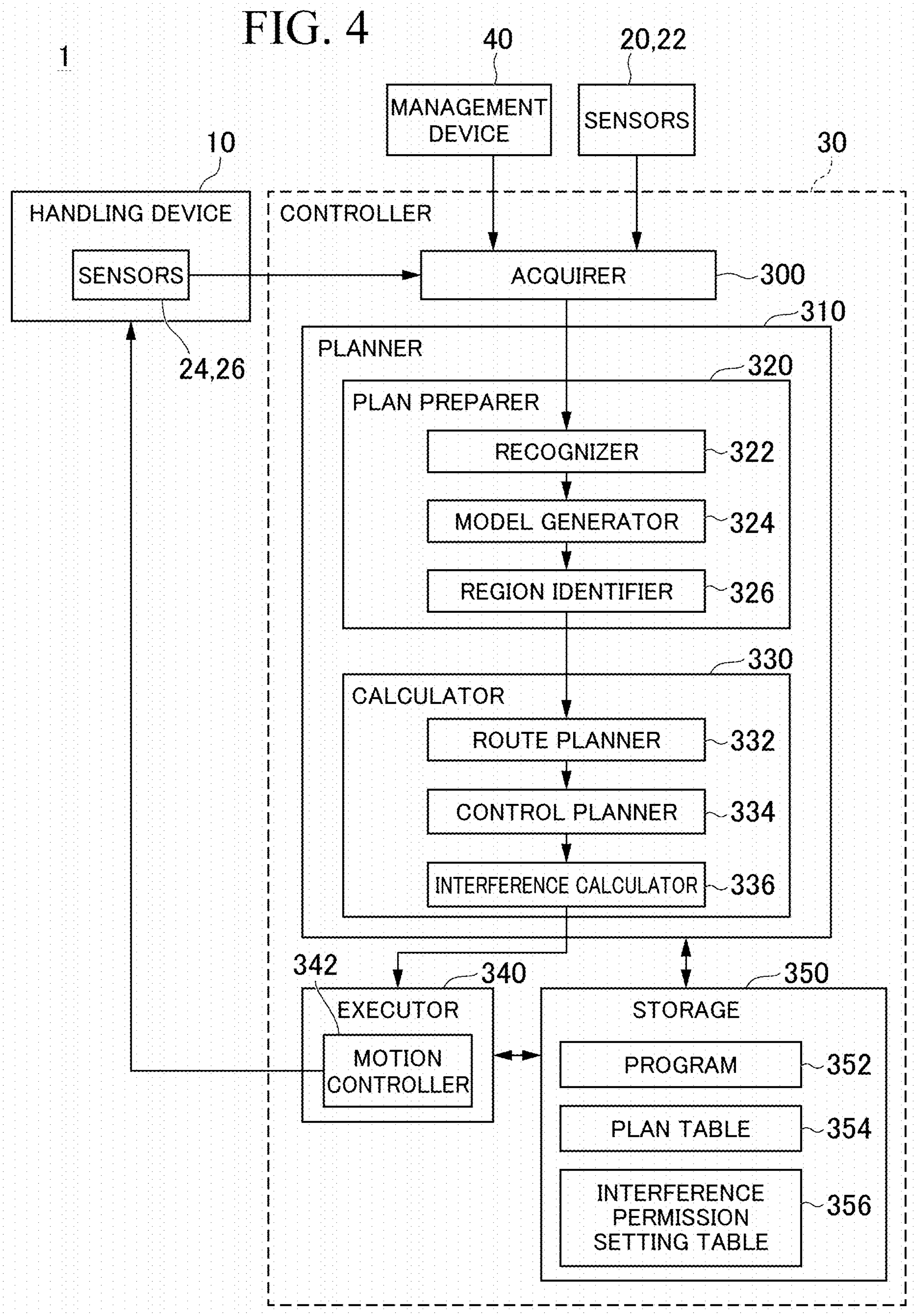
FIG. 4 is a block diagram showing the configuration of the handling system according to the embodiment.

FIG. 4 is a block diagram showing the configuration of the handling system 1 according to the embodiment.

As shown in FIG. 1, the handling system 1 is a system for handling one or more objects. The handling system 1 is, for example, a transport system for logistics and a picking system. For example, the handling system 1 moves an object (a physical object) O positioned in a movement source V1 to a movement destination V2. For example, the handling system 1 extracts a designated number of objects from one or more types of objects O stored in the movement source V1 or the like and performs a motion for loading the objects to the movement destination V2.

The movement source V1 is, for example, any of various types of conveyors, various types of pallets, a container such as a tote bag or a collapsible container, or the like. The "container" broadly refers to a member capable of accommodating an object O (e.g., a box-shaped member). However, the movement source V1 is not limited to the example described above. In the following description, the "movement source V1" may be referred to as an "extraction source container V1."

One or more objects O are randomly placed in the movement source V1. The movement source V1 may store one or more objects O of the same type or may store one or more of objects O of each of two or more types. For example, the movement source V1 stores a plurality of objects O of the same type. For example, the object O to be held may be a flexible and easily deformable object or a rigid and hardly deformable object. The object O to be held may have an irregular shape on at least a part of a surface thereof. In the present embodiment, there are various types of outer shapes of objects O from a small object of a 5 cm square or the like to a large object of a 30 cm square or the like. Also, there are various types of objects O from a light object of several tens of grams (g) or the like to a heavy object of several kilograms (kg) or the like. However, the size and the weight of the object O are not limited to the examples described above.

The movement destination V2 is, for example, a container such as a tote bag or a collapsible container. However, the movement destination V2 is not limited to the above-described examples. For example, the handling system 1 may move the object O to the movement destination V2 other than the container. In the following description, the "movement destination V2" may be referred to as a "transport destination container V2" and the "movement source V1" and the "movement destination V2" may be simply collectively referred to as "containers V1 and V2."

The handling system 1 is not limited to a handling system for logistics. The handling system 1 can be widely applied to industrial robot systems or other systems. The "handling system," and "handling device" mentioned in the present specification are not limited to systems and devices whose main purpose is to transport objects and include systems and devices that transport (move) objects as a part of product assembly or for another purpose.

As shown in FIG. 1, the handling system 1 includes a handling device 10, various types of sensors 20, 22, 24, and 26, a control device 30 (an example of a "controller"), and a management device 40. In addition, the "handling system" in the present specification is not limited to a handling system including two or more devices, and may include a single handling device (e.g., a handling device in which a sensor and a control device are incorporated). That is, the single handling device is also called a "handling system" in the present specification.

The handling device 10 is, for example, a robot device. The handling device 10 holds the object O positioned in the extraction source container V1 and moves the held object O to the transport destination container V2. The handling device 10 can communicate with the control device 30 by wire or wirelessly. In the present embodiment, the handling device 10 has a first handling device 12 and a second handling device 14.

The first handling device 12 includes, for example, a first movable arm 110 and a pincher 120 (an example of a "holder") provided at the tip of the first movable arm 110.

The first movable arm 110 is a moving mechanism that moves the pincher 120 to a desired position. For example, the first movable arm 110 is a six-axis vertical articulated robot arm. The first movable arm 110 can take various positions and postures. Like human arms or hands, the first movable arm 110 can take a wider variety of postures to hold an object. The first movable arm 110 includes, for example, a plurality of arm members 112 and a plurality of rotators 114 in which a plurality of arm members 112 are rotatably connected.

A configuration of the first movable arm 110 is not particularly limited and may be a three-axis Cartesian robot arm. The first movable arm 110 may be a mechanism for moving the pincher 120 to a desired position using other components. For example, the first movable arm 110 may be a flying object (e.g., a drone) that lifts and moves the pincher 120 using a rotary wing or the like.

The pincher 120 is a holding mechanism (end effector) for holding the object O positioned in the extraction source container V1. For example, the pincher 120 has a gripper type pinching hand for gripping the object O by pinching the object O with two fingers. The pincher 120 can be provided on the tip of the first movable arm 110. The configuration of the pincher 120 is not limited to this and may be, for example, a gripper-type hand for gripping the object O by pinching the object O with three fingers or four fingers.

As shown in FIGS. 1 and 2, the pincher 120 includes two or more supports 122, two or more pinching claws 124 respectively attached to the two or more supports 122 and configured to hold the object O, and a movable body 128 (an example of an "interference permitter") provided on the tip portion of the pinching claw 124. Hereinafter, a movable link portion including the support 122 and the pinching claw 124 is also collectively called a pinching hand body 126 (an example of a "main body"). The pinching hand body 126 is operable to hold the object O. Here, the term "operable to hold the object" includes not only a case where the pinching hand body 126 directly comes into contact with the object O to hold the object O but also a case where the object O is indirectly held via another portion such as the movable body 128 provided in the pinching hand body 126.

The support 122 is pivotally attached to the tip portion of the first movable arm 110. For example, one end of the support 122 is pivotally attached to the tip portion of the first movable arm 110, and the other end of the support 122 is pivotally attached to one end of the pinching claw 124. Thereby, the support 122 supports the pinching claw 124. A pivotal motion of the support 122 can be controlled, for example, via a signal from a control device 30 or the like. In FIGS. 1 and 2, the pincher 120 has a pair of supports 122.

The pinching claw 124 is pivotally attached to the end of the support 122. Two or more pinching claws 124 pinch and hold the object O in cooperation. In FIGS. 1 and 2, the pincher 120 has a pair of pinching claws 124.

The movable body 128 is attached to the pinching claw 124 so as to be relatively displaceable or deformable thereto. For example, in FIG. 2, the movable body 128 is configured to be slidable with respect to the pinching claw 124 in an extension direction (a Z-direction in FIG. 2) of the pinching claw 124. The movable body 128 is provided on the tip portion of the pincher 120. For example, the movable body 128 moves to slide with respect to the pinching claw 124 in response to a force received in a sliding direction (the Z-direction in FIG. 2). Thereby, the movable body 128 can absorb a force applied to the tip portion of the pincher 120.

For example, the movable body 128 can be displaced with respect to the pinching hand body 126 in a direction (the Z-direction in FIG. 2) intersecting the pinching direction (an X-direction in FIG. 2) of the pincher 120.

Although the movable body 128 is attached to the inside of the pincher 120 so as to be adjacent to the pinching claw 124 in an example shown in FIG. 2, an arrangement of the movable body 128 is not limited thereto. For example, the movable body 128 may be provided outside of the pincher 120 or on an extension line of the pinching claw 124. For example, the movable body 128 may be a deformable body such as a rubber provided on the tip portion of the pinching claw 124. Moreover, in a case where one end of the movable body 128 is attached to the tip of the pinching claw 124 through a deformation member such as a spring, the movable body 128 may be relatively displaced with respect to the pinching claw 124. Alternatively, the movable body 128 may be slidably provided in an internal space of the pinching claw 124 so as to enter and exit from the tip of the pinching claw 124. Moreover, the movable body 128 may be provided in a sleeve shape surrounding the pinching claw 124 and slidable on the pinching claw 124.

The pincher 120 may be a hybrid hand further having a suction device and an adsorption pad communicating with the suction device. In this case, the pincher 120 can hold the object O in pinching and/or adsorption processes. One or more adsorption pads can be provided on the pinching claw 124 or the movable body 128. In addition, the configuration of the pincher 120 is not particularly limited.

As shown in FIG. 1, the second handling device 14 has, for example, a second movable arm 130 and an adsorber 140 (an example of the "holder") provided at the tip of the second movable arm 130. A second movable arm 130 of the second handling device 14 has an arm member 132 and a rotator 134 like the first movable arm 110 of the first handling device 12.

The adsorber 140 is a holding mechanism (end effector) configured to hold the object O positioned in the extraction source container V1. For example, the adsorber 140 has an adsorption hand configured to hold the object O according to adsorption.

As shown in FIGS. 1 and 3, the adsorber 140 includes an adsorption hand body 142 (an example of a "main body"), a suction device 144 attached to the adsorption hand body 142, and an adsorption pad 146 (an example of an "interference permitter") communicating with the suction device 144 through the adsorption hand body 142. The adsorption hand body 142 is operable to hold the object O. Here, the term "operable to hold the object O" includes not only a case where the adsorption hand body 142 directly comes into contact with the object O to hold the object O but also a case where the object O is indirectly held via another portion such as the adsorption pad 146 provided in the adsorption hand body 142.

The adsorption hand body 142 is attached to the tip portion of the second movable arm 130. The adsorption hand body 142 supports the adsorption pad 146. For example, the adsorption hand body 142 has an internal space for connecting the suction device 144 and the adsorption pad 146.

The suction device 144 is, for example, a vacuum pump. The suction device 144 communicates with each of a plurality of adsorption pads 146 via a hose or the like. The suction device 144 is driven and therefore the pressure within each adsorption pad 146 becomes lower than atmospheric pressure. Thereby, the adsorption pad 146 can adsorb and hold the object O. The suction device 144 may be provided within the adsorption hand body 142 or within the second movable arm 130.

The adsorption pad 146 is provided on the tip portion of the adsorption hand body 142. The configuration of the adsorption pad 146 is not particularly limited and can have any shape and structure in which adsorption is possible. For example, the adsorption pad 146 is a vacuum pad having a bellows shape. Although only one adsorption pad 146 is provided at the tip of the adsorption hand body 142 in examples shown in FIGS. 1 and 3, the number of adsorption pads 146 is not particularly limited. For example, the adsorption pad 146 has an outer shape smaller than the minimum object O positioned in the extraction source container V1.

In the following description, the "pincher 120" and the "adsorber 140" are collectively referred to as the "holder 100." That is, it is assumed that the "holder 100" includes the "pincher 120" and the "adsorber 140." Here, the handling device 10 including the pincher 120 and the adsorber 140 has been described as an example. However, the configuration of the holder 100 is not limited to a configuration including one pincher 120 and one adsorber 140 as described above. For example, the holder 100 may include two or more pinching hands or may include two or more adsorption hands. In this case, the holder 100 may be configured to have a plurality of pinching-type hands that are different in at least any one of properties such as, for example, a configuration, a structure, a shape, a size, and an arrangement. Specifically, for example, the holder 100 may include two or more pinching hands having claws of different lengths and opening widths. Alternatively, the holder 100 may be configured to have two or more adsorption hands which are different in at least any one of the properties such as, for example, a configuration, a structure, a shape, a size, and an arrangement. Specifically, the holder 100 may include two or more adsorption hands having different adsorption pad arrangements, adsorption pad diameters, bellows structures, and the like. Even in such cases, it is possible to execute a handling operation similar to that of the above-described embodiment and obtain equivalent effects.

The holder 100 may be a hybrid type hand having a pinching hand and an adsorption hand facing different directions (for example, opposite directions) and capable of properly switching a type of hand for holding the object O.

The handling device 10 may have a mechanism for holding the object O in a holding method other than pinching and adsorption, in addition to the pincher 120 and the adsorber 140 or in place of the pincher 120 and/or the adsorber 140. For example, the handling device 10 may have a holder capable of holding the object O with a magnetic force. Alternatively, the handling device 10 may have a holder (e.g., a jamming gripper) including a flexible membrane filled with powder and a vacuum pump that extracts air from the flexible membrane and configured to hold the object O using a jamming phenomenon.

Various types of sensors 20, 22, 24, and 26 detect the state of the object O and the state of the holder 100. The sensors 20 to 26 are connected to the control device 30 by wire or wirelessly and transmit detection results to the control device 30. The sensors 20 to 26 may not necessarily be separate sensors, and a specific sensor may independently perform the functions of two or more sensors among the sensors 20 to 26.

The movement source sensor 20 is a light intensity sensor such as a camera or any one of various types of sensors arranged near the extraction source container V1 (e.g., directly above or diagonally above the extraction source container V1). The movement source sensor 20 acquires, for example, information about the object O positioned in the movement source V1 and information about the movement source V1. The information acquired by the movement source sensor 20 is, for example, "image data," "distance image data," "shape data," and the like. The "distance image data" is image data having distance information in one or more directions (e.g., depth information from any reference plane set above the movement source V1). The "shape data" is information indicating an outer shape of the object O and the like. The information detected by the movement source sensor 20 is output to the control device 30. Also, the movement source sensor 20 may be provided as a part of the handling device 10.

The movement destination sensor 22 is a camera or any one of various types of sensors arranged near the transport destination container V2 (e.g., directly above or diagonally above the transport destination container V2). The movement destination sensor 22 detects, for example, information about the shape of the movement destination container V2 (including shapes of the inner wall surface and the partition) and information about an object O previously placed in the movement destination container V2. The information acquired by the movement destination sensor 22 is, for example, "image data," "distance image data," "shape data," and the like. The information detected by the movement destination sensor 22 is output to the control device 30. In addition, the movement destination sensor 22 may be provided as a part of the handling device 10.

The pincher sensor 24 is a sensor provided on the pincher 120 (for example, on the surface and/or inside of the pinching claw 124 and/or the movable body 128) or in the vicinity of the pincher 120. The pincher sensor 24 acquires information about the holding state of the object O in the pincher 120. The pincher sensor 24 acquires information about a physical state of the pincher 120 such as, for example, a pressure (i.e., a magnitude of reaction of the pinching motion) received by the pinching claw 124 or the movable body 128 from the object O or the distortion or surface state of the pinching claw 124 or the movable body 128. The information can directly or indirectly indicate a force with which the pincher 120 holds the object O. The pincher sensor 24 includes one or more physical sensors such as a distortion sensor, a pressure sensor, and a proximity-contact sensor. The pincher sensor 24 may also acquire physical information of the object O. The pincher sensor 24 can be provided as a part of the handling device 10. Although the pincher sensor 24 is provided inside of the pinching claw 124 in FIGS. 1 and 2, the position of the pincher sensor 24 is not particularly limited as long as the above-described function is exhibited. For example, the pincher sensor 24 may be provided on the surface of the pinching claw 124, may be provided inside or on the surface of the movable body 128, or may be provided on both the pinching claw 124 and the movable body 128.

The adsorber sensor 26 is a sensor provided on the adsorber 140 (for example, on the surface and/or inside of the adsorption hand body 142 and/or the adsorption pad 146) or in the vicinity of the adsorber 140. The adsorber sensor 26 acquires information about the holding state of the object O in the adsorber 140. The adsorber sensor 26 acquires information about a physical state of the adsorber 140 such as, for example, an amount of distortion or deformation of the adsorption pad 146, an internal pressure of the adsorption pad 146, or an operating state of the suction device 144. The information can directly or indirectly indicate a force with which the adsorber 140 holds the object O. The adsorber sensor 26 includes one or more physical sensors such as a pressure sensor, a distortion sensor, and a proximity-contact sensor. The adsorber sensor 26 may further acquire physical information of the object O. The adsorber sensor 26 can be provided as a part of the handling device 10.

As shown in FIG. 4, the control device 30 includes an acquirer 300, a planner 310, an executor 340, and a storage 350 as its functional portions.

The acquirer 300 receives an input operation from a user and an input signal from a management device 40 and acquires order information including a list of objects O to be picked up and the like. Moreover, the acquirer 300 acquires information including detection results from the movement source sensor 20, the movement destination sensor 22, the pincher sensor 24, and the adsorber sensor 26.

The planner 310 generates a holding plan for the holder 100 to hold the object O on the basis of the information acquired by the acquirer 300. Specifically, the planner 310 includes a plan preparer 320 and a calculator 330. In addition, the planner 310 may be mounted as a single planning device or a planning system (an example of an "information processing system"). In the present specification, the "planning system" or the "information processing system" is not limited to a planning system or an information processing system including two or more devices like the "handling system" and may include a single planning device or a single information processing device.

The plan preparer 320 processes the information acquired by the acquirer 300 before a calculation process is performed for a specific holding plan. Specifically, the plan preparer 320 includes a recognizer 322, a model generator 324, and a region identifier 326.

The recognizer 322 performs image recognition for the image data in any known method. For example, the recognizer 322 performs image recognition by receiving image data of an extraction source container V1 and a transport destination container V2 acquired by the transport source sensor 20 and the transport destination sensor 22. Specifically, the recognizer 322 can perform the segmentation of an object in an image using any known method and identify a position, orientation, shape, type, and the like of an object O in the image, the containers V1 and V2, an obstacle in a surrounding environment, or the like.

For example, the recognizer 322 can perform segmentation using deep learning or the like. Moreover, the recognizer 322 can recognize the position of the object in the image by detecting the contour of the object O in the image. Moreover, the recognizer 322 can estimate the shape of the object in the image on the basis of, for example, distance image data.

The model generator 324 generates a three-dimensional model of each object recognized in an image on the basis of a recognition result of the recognizer 322. The model generator 324 reproduces the arrangement of each object in the real space within a model space by arranging the generated model within a three-dimensional virtual space (model space). Specifically, the model generator 324 can generate a model of the holder 100 or the handling device 10 itself including the holder 100, a model of one or more objects O, a model of the extraction source container V1 or the transport destination container V2, a model of the object in the surrounding environment, or the like. The model generator 324 can generate these three-dimensional models in any known method.

The region identifier 326 identifies a holding region of the object O estimated to be held by the holder 100 according to any known method on the basis of a result of the recognition process of the recognizer 322 and/or a three-dimensional model generated by the model generator 324. The region identifier 326 can identify a plurality of holding regions as candidates for a holding region for the holder 100 (i.e., the pincher 120 or the adsorber 140) to hold the object O.

For example, in a case where the object O is held by the pincher 120, the region identifier 326 searches for a position where the pincher 120 can insert the pinching claw 124 on the basis of the shape information of the object O recognized by the recognizer 322.

For example, in a case where the object O is held by the adsorber 140, the region identifier 326 searches for a surface region of the object O capable of being adsorbed by the adsorber 140 on the basis of the shape information of the object O recognized by the recognizer 322 or the like.

The calculator 330 performs a calculation process of generating a specific holding plan on the basis of various types of information processed by the plan preparer 320. Specifically, the calculator 330 includes a route planner 332, a control planner 334, and an interference calculator 336.

The route planner 332 plans a movement route of the holder 100. For example, this route plan can include a route for the holder 100 to access the extraction source container V1 and hold the object O within the extraction source container V1. Moreover, the route plan can include a route for carrying the held object O from the extraction source container V1 to the transport destination container V2. Furthermore, the route plan can include a route for the holder 100 to access the transport destination container V2 and release the held object O within the transport destination container V2.

Specifically, the route planner 332 can decide on spatial positions of a plurality of waypoints that the holder 100 passes through. For example, the route planner 332 designates a three-dimensional position in the model space generated by the model generator 324, thereby setting a waypoint within the model space. The route planner 332 can generate a trajectory connecting these waypoints and set the trajectory as a movement route of the holder 100. The route planner 332 can designate position information of the waypoint and orientation information of the holder 100 at the waypoint. For example, the route planner 332 can set the direction of the holder 100, the degree of opening of the pinching claw 124 of the pincher 120, or the like at each waypoint. That is, the route planner 332 can decide on the position/orientation information of the holder 100 for each waypoint. The route planner 332 can convert the position of the waypoint in the model space and the information of the movement route into position information of a real space.

The route planner 332 can plan a movement route using a pre-prepared set of waypoints. For example, for the holding motion of the pincher 120, the following waypoints (1) to (5) can be prepared in advance. The specific positions of the waypoints are not identified and the route planner 332 decides on the position information of the waypoints, thereby generating the movement route of the holder 100.

(1) A waypoint GAP1 positioned just above the extraction source container V1

(2) A waypoint GAP2 positioned sufficiently close to the object O (3) A waypoint GP set as a target position immediately before the object O is held (4) A waypoint GPclose during the holding motion (5) A waypoint GAP3 when the object O is held and separated from the extraction source container V1

Moreover, the route planner 332 can also calculate an orientation in which the holder 100 holds the object O in the candidate region, an amount of opening or an amount of insertion of the pinching claw 124 in a case where the pincher 120 holds the object O, the number and arrangement of the adsorption pads 146 used in a case where the adsorber 140 holds the object O, and the like using any known method.

The control planner 334 plans control content of the handling device 10 on the basis of a movement route generated by the route planner 332. Specifically, the control planner 334 can plan a motion control method of the holder 100, a movement speed of the holder 100, control content of a pinching motion of the pincher 120 and/or an adsorption motion of the adsorber 140, and the like.

Examples of the motion control method of the holder 100 include positional control and mechanical control. The positional control is a process of controlling the holder 100 to move to a specific target position on the basis of the positional information of the waypoint or the like. Examples of the positional control include a control method including an instruction for moving the holder 100 from a waypoint GAP1 above the extraction source container V1 to a waypoint GAP2 where the distance to the object O is a predetermined distance. The mechanical control is a process of controlling the motion of the holder 100 on the basis of the mechanical physical quantities acquired by the sensors 24 and 26 and the like provided in the holder 100. Examples of the mechanical control include a control method including an instruction for causing the holder 100 to continue the motion until a specific mechanical physical quantity reaches a predetermined value or exceeds or falls below the predetermined value. More specific examples include a control method including an instruction for causing the pincher 120 to pinch the object O until a magnitude of reaction from the object O increases to reach a predetermined value and control content including an instruction for causing the adsorber 140 to continue the approach motion for the object O until the pressure in the adsorption pad 146 decreases to reach the predetermined value and the like.

The control planner 334 can divide the movement route into a plurality of segments and plan the control content of the handling device 10 for each segment. For example, the control planner 334 can divide the movement route is divided into a first segment, a second segment, and a third segment, and generate a control plan so as to use positional control as the motion control method of the holder 100 in the first segment, use both the positional control and the mechanical control as the motion control method of the holder 100 in the second segment, and use the mechanical control as the motion control method of the holder 100 in the third segment.

For example, the control planner 334 can switch the mode among the following (a) to (c) in accordance with the segment of the movement route as the motion control method in a case where the holder 100 holds the object O within the extraction source container V1.

(a) A first movement mode: performing positional control; applicable to a segment where the holder 100 moves at a position that is a specified distance or more from the object O.

(b) A first intermediate mode: performing both positional control and mechanical control; applicable to a segment where the holder 100 moves at a distance less than a specific distance from the object O.

(c) A holding mode: performing mechanical control; applicable to a segment where the holder 100 performs the holding motion on the object O.

Moreover, the control planner 334 can switch the mode among the following (d) to (f) in accordance with the segment of the movement route as the motion control method in a case where the holder 100 releases the object O within the transport destination container V2.

(d) A second movement mode: performing the positional control; applicable to a segment where the holder 100 moves at a position that is a predetermined distance or more from the bottom surface of the transport destination container V2 while the holder 100 holds the object O.

(e) A second intermediate mode: performing both the positional control and the mechanical control; applicable to a segment where the holder 100 moves at a distance less than a specific distance from the bottom surface of the transport destination container V2 while the holder 100 holds the object O.

(f) A release mode: performing the mechanical control; applicable to a segment where the holder 100 releases the object O.

In (b) first intermediate mode and (e) second intermediate mode described above, the motion of the holder 100 can be controlled such that the holder 100 continues movement toward the target position, for example, until one of the following conditions (i) and (ii) is satisfied.

(i) The position reaches the target position.

(ii) The mechanical physical quantity satisfies a predetermined condition (e.g., the mechanical physical quantity reaches a predetermined value or the mechanical physical quantity exceeds or falls below a predetermined threshold value).

Moreover, the control planner 334 can generate a control plan so as to use the first movement speed as the movement speed of the holder 100 in the first segment, use the second movement speed lower than the first movement speed as the movement speed of the holder 100 in the second segment, and use the third movement speed lower than the second movement speed as the movement speed of the holder 100 in the third segment. The movement speed of the holder 100 may not necessarily be uniform in the segment or may be set to be arbitrarily changed within the segment. For example, the control planner 334 may be set such that the movement speed of the holder 100 increases or decreases in accordance with the movement distance in a specific segment.

The interference calculator 336 calculates physical interference between the holder 100 and another object. For example, the interference calculator 336 performs a simulation in which the three-dimensional model of the holder 100 is moved along a movement route within a model space. Thereby, the interference calculator 336 can determine whether or not the model of the holder 100 is in contact with the model of another object.

The interference calculator 336 can permit interference in part or in whole in accordance with the segment of the movement route. For example, the holder 100 inevitably comes into contact with the object O in a segment where the holder 100 holds the object O. Therefore, the interference calculator 336 permits interference between the holder 100 and the object O in this segment.

The interference calculator 336 can switch between whether or not to permit interference with respect to only a part of the holder 100 as well as between whether or not to permit interference with respect to the whole of the holder 100. For example, the interference calculator 336 may permit interference only with respect to the movable body 128 without permitting interference of the pinching hand body 126 of the pincher 120 in a specific segment within the movement route. Moreover, the interference calculator 336 may permit interference only with respect to the adsorption pad 146 without permitting interference of the adsorption hand body 142 of the adsorber 140 in a specific segment within the movement route.

Next, examples of a motion control method and an interference permission setting determination method for the holder 100 for each segment in the control planner 334 and the interference calculator 336 will be described with reference to FIGS. 5 and 6.

FIG. 5 shows an example of a plan table 354 according to the embodiment.

FIG. 6 shows an example of an interference permission setting table 356 related to an embodiment.

As shown in FIG. 5, the plan table 354 includes “segment,” “positional control,” “mechanical control,” and “interference permission setting” fields. The “segment” field further includes “FROM” and “TO” fields. The “segment” field indicates a segment starting at the waypoint described in the “FROM” field and a segment ending at the waypoint described in the “TO” field. In the “positional control” field, “ON” indicates that positional control is performed as the motion control method for the holder 100 in the segment and “OFF” indicates that positional control is not performed as the motion control method for the holder 100 in the segment. In the “mechanical control” field, “ON” indicates that mechanical control is performed as the motion control method for the holder 100 in the segment and “OFF” indicates that mechanical control is not performed as the motion control method for the holder 100 in the segment. The “interference permission setting” field indicates an identification number of the interference permission setting applied in the segment. Details of each interference permission setting are shown in FIG. 6.

As shown in FIG. 6, the interference permission setting table 356 is a table summarizing the content of each interference permission setting. The interference permission setting table 356 includes a combinatorial table in which physical objects in a work space are vertically enumerated for each interference permission setting and components of the handling device 10 are horizontally enumerated. In FIG. 6, as examples of physical objects within the work space, "containers" (corresponding to the extraction source container V1 and the transport destination container V2), "surrounding environment" (corresponding to an obstacle in the surrounding environment), "object" (corresponding to the object O), and the like are enumerated in the vertical direction. As examples of components of the handling device 10, "main body" (corresponding to the pinching hand body 126 or the adsorption hand body 142), "interference permitter" (corresponding to the movable body 128 or the adsorption pad 146), and the like are enumerated in the horizontal direction.

In each alignment table in FIG. 6, "YES" indicates that interference between an object in the working space and a component of the handling device 10 is permitted and "NO" indicates that interference between an object in the working space and a component of the handling device 10 is not permitted. For example, in interference permission setting 001, the interference calculator 336 does not permit the main bodies 126 and 142 of the holder 100 and the interference permitters 128 and 146 to interfere with any of the containers V1 and V2, the obstacles in the surrounding environment, and the object O. In interference permission setting 002, the interference calculator 336 does not permit the main bodies 126 and 142 of the holder 100 to interfere with any of the containers V1 and V2, the obstacles in the surrounding environment, or the object O, but permits the interference permitters 128 and 146 to interfere with the containers V1 and V2, the obstacles in the surrounding environment, or the object O. In interference permission setting 003, the interference calculator 336 permits the bodies 126 and 142 of the holder 100 and the interference permitters 128 and 146 to interfere with any of the containers V1 and V2, the obstacles in the surrounding environment, and the object O.

Using a segment from a waypoint GAP1 to a waypoint GAP2 indicated in a first row of the plan table 354 in FIG. 5 as an example, the control planner 334 can decide to perform positional control as the motion control method for the segment with reference to the plan table 354. The interference calculator 336 can decide to use the interference permission setting 001 as the interference permission setting for the segment with reference to the plan table 354. Accordingly, the interference calculator 336 decides whether or not to permit interference in accordance with the interference permission setting 001 shown in FIG. 6 in a segment from GAP1 to GAP2. That is, the interference calculator 336 checks the physical interference of the whole holder 100 without permitting any interference in the segment from GAP1 to GAP2.

The interference calculator 336 may decide an interference permission setting according to an attribute of the object O. For example, there may be an indefinite flag validly set for an object O which is likely to be deformed and invalidly set for an object O which is not likely to be deformed. In a case where the indefinite flag of the object O is invalid, the interference calculator 336 refers to the interference permission setting table 356 as shown in FIG. 6 as described above. On the other hand, in a case where the indefinite flag of the object O is valid, the interference calculator 336 can refer to the interference permission setting table for the object O having an indefinite shape different from the interference permission setting table 356. In the interference permission setting table, for example, even in the interference permission setting 001, interference between the object O and the interference permitters 128 and 146 can be permitted. Thereby, the planner 310 can generate a holding plan by permitting some contact between the easily deformable object O and the interference permitter.

Next, the switching of the motion control of the holder 100 and the calculation of physical interference will be described in detail with reference to FIGS. 7A to 10E.

FIGS. 7A to 7F are schematic diagrams showing examples of the route planning process of the holding motion of the pincher 120 according to the embodiment.

FIGS. 8A to 8F are schematic diagrams showing examples of the route planning process of the release motion of the pincher 120 according to the embodiment.

FIGS. 9A to 9E are schematic diagrams showing examples of the route planning process of the holding motion of the adsorber 140 according to the embodiment.

FIGS. 10A to 10E are schematic diagrams showing examples of the route planning process of the release motion of the adsorber 140 according to the embodiment.

First, a case where the pincher 120 holds the object O within the extraction source container V1 will be described with reference to FIGS. 7A to 7F.

Figure 7A:
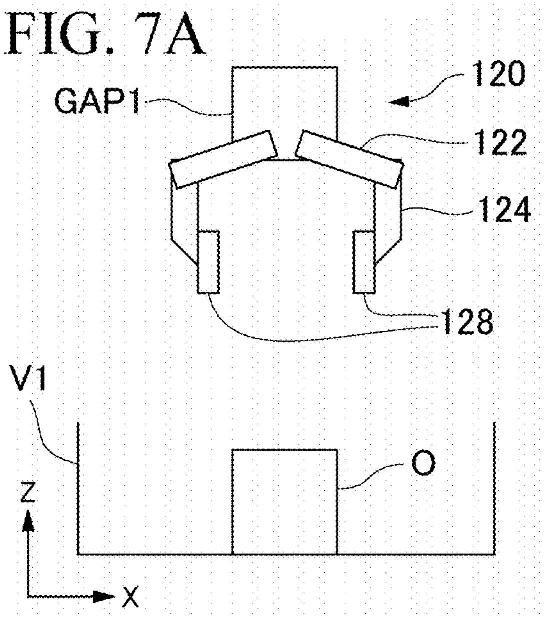
FIG. 7A is a schematic diagram showing an example of a route planning process of a holding motion of the pincher according to the embodiment.

FIG. 7A shows a waypoint GAP1 where the pincher 120 is positioned above the extraction source container V1. The pincher 120 is positioned directly above the object O to be held.

Figure 7B:
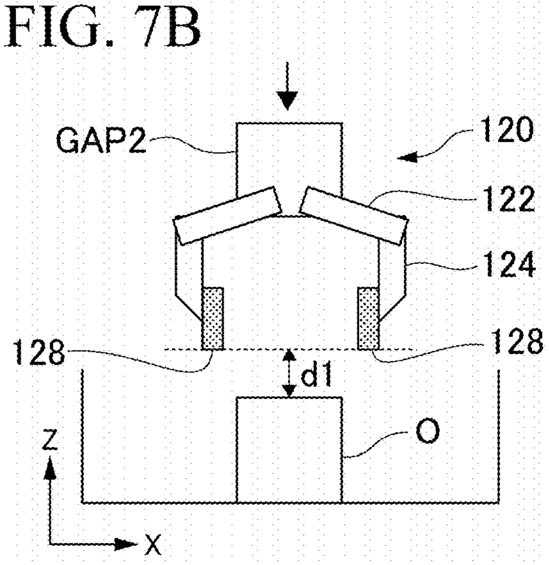
FIG. 7B is a schematic diagram showing an example of a route planning process of a holding motion of the pincher according to the embodiment.

FIG. 7B shows a waypoint GAP2 where the pincher 120 is positioned at a predetermined distance d1 from the object O to be held. The waypoint GAP2 is a point where the pincher 120 is regarded to be positioned sufficiently near the object O.

Figure 7C:
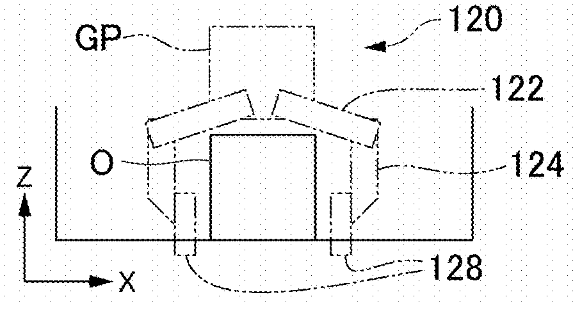
FIG. 7C is a schematic diagram showing an example of a route planning process of a holding motion of the pincher according to the embodiment.

FIG. 7C shows a virtual waypoint GP set as a target position immediately before the pincher 120 grasps the object O. The positional control of the pincher 120 is performed such that the pincher 120 moves from the waypoint GAP2 of FIG. 7B to the waypoint GP which is the target position. However, as shown in FIG. 5, movement from the waypoint GAP2 to the waypoint GP is performed together with the mechanical control as described below as well as the positional control.

Figure 7D:
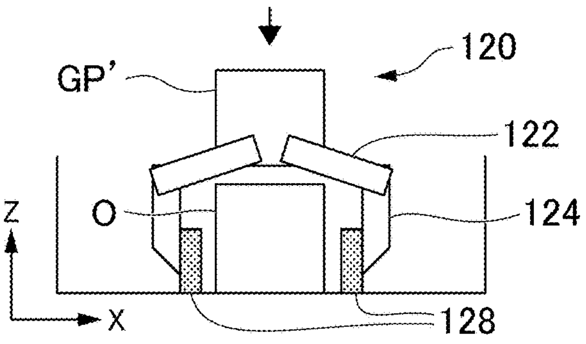
FIG. 7D is a schematic diagram showing an example of a route planning process of a holding motion of the pincher according to the embodiment.

FIG. 7D shows a waypoint GP' after the pincher 120 is moved from the waypoint GAP2 of FIG. 7B according to positional control and mechanical control. For example, the pincher sensor 24 detects a force applied to the pincher 120 from the bottom surface of the extraction source container V1 in a case where the tip of the pincher 120 is in contact with the bottom surface of the extraction source container V1. In a case where this force reaches a predetermined value in a process from the waypoint GAP2 to the waypoint GP according to the positional control, even before the pincher 120 reaches the target position GP, the movement of the pincher 120 is stopped at that time. The stop position becomes the position GP' immediately before the pincher 120 grasps the object O.

On the other hand, in a case where the pincher 120 reaches the waypoint GP which is the target position before the force detected by the pincher sensor 24 reaches the predetermined value, the movement of the pincher 120 is stopped at that time. The stop position becomes a position GP' immediately before the pincher 120 grasps the object O. In this case, GP' is consistent with the waypoint GP set as the target position. That is, the position GP' is a position that the pincher 120 actually reaches according to the combined use of the positional control and the mechanical control.

Thus, the control planner 334 plans the combined use of the positional control and the mechanical control in which the pincher 120 continues movement toward the target position GP until the pincher 120 reaches the target position GP or until the force detected by the pincher sensor 24 reaches a predetermined value. FIG. 7D shows a waypoint GP' when the force detected by the pincher sensor 24 reaches the predetermined value before the pincher 120 reaches the target position GP. The movable body 128 is in contact with the bottom surface of the extraction source container V1 and moves to slide in the +Z-direction with respect to the pinching claw 124. That is, at the waypoint GP' of FIG. 7D, the movable body 128 is pushed toward the pinching hand body 126 by the bottom surface of the extraction source container V1. Thereby, the movable body 128 can absorb an impact when the pincher 120 comes into contact with the bottom surface of the extraction source container V1.

For example, as shown in FIG. 7C, a part of the target position GP can be set to a position deeper than the bottom surface of the extraction source container V1. Thereby, as shown in FIG. 7D, it is possible to stop the movement of the pincher 120 while causing the movable body 128 to absorb an impact received from the bottom surface of the extraction source container V1 by the pincher 120 at the position GP' in front of (i.e., above) the target position GP according to the mechanical control. Thereby, the motion of the pincher 120 can be precisely controlled in the vicinity of the object O having a relatively high possibility of physical interference.

Figure 7E:
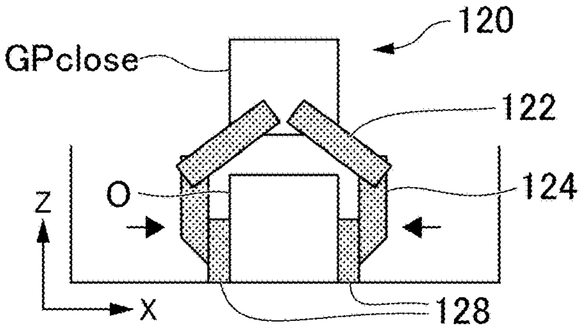
FIG. 7E is a schematic diagram showing an example of a route planning process of a holding motion of the pincher according to the embodiment.

FIG. 7E shows a waypoint GPclose when the pincher 120 grasps the object O. At the waypoint GPclose, a plurality of pinching claws 124 move toward the object O and the pincher 120 grasps the object O. The motion of the pinching claw 124 is controlled on the basis of a magnitude of a reaction force from the object O detected by the pincher sensor 24. That is, the control planner 334 plans the mechanical control in which the pincher 120 continuously performs the pinching motion on the object O until the magnitude of the reaction force received by the pincher 120 from the object O reaches a predetermined value.

Figure 7F:
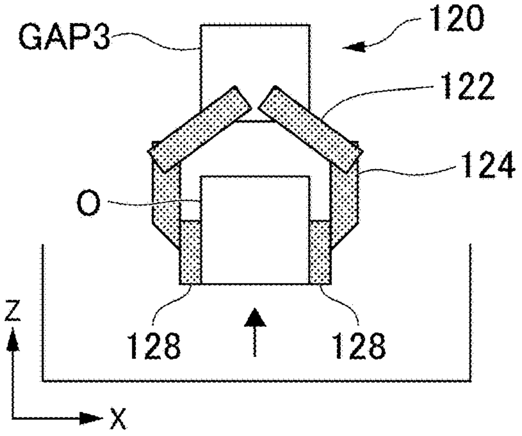
FIG. 7F is a schematic diagram showing an example of a route planning process of a holding motion of the pincher according to the embodiment.

FIG. 7F shows a waypoint GAP3 when the pincher 120 pinches and lifts up the object O and is separated from the extraction source container V1. The waypoint GAP3 is a position above the extraction source container V1 and the pincher 120 is in a state in which the object O is held. In this case, the movable body 128 moving to slide in the +Z-direction with respect to the pinching claw 124 in FIG. 7D can be returned to the original position by moving to slide in the −Z direction with respect to the pinching claw 124.

Here, a part indicated in a dot pattern in the drawing is a part where interference is permitted in a segment from the waypoint to the next waypoint.

In a segment from GAP1 of FIG. 7A to GAP2 of FIG. 7B, the control planner 334 plans motion control using the positional control with the waypoint GAP2 as a target position. In this segment, because the pincher 120 is separated from the object O to a certain extent, the interference calculator 336 does not permit the interference of the entire pincher 120. Thus, in a case where the interference calculator 336 determines that the pincher 120 interferes with another object in the segment from GAP1 to GAP2, the interference calculator 336 can invalidly set the entire movement route (i.e., makes the entire movement route unavailable in an actual operation). Also, in FIGS. 5 and 6, in this segment, it is identified that the positional control is valid as the motion control method and interference permission setting 001 not permitting any interference is applied.

In a segment from GAP2 of FIG. 7B to GP' of FIG. 7D, the control planner 334 plans motion control in which the positional control with the waypoint GP as the target position and the mechanical control based on the reaction force received by the movable body 128 from the bottom surface of the extraction source container V1 are used in combination. In this segment, because the pincher 120 is close to the object O, the interference calculator 336 permits only the interference of the movable body 128 provided on the tip portion of the pincher 120. Also, in FIGS. 5 and 6, in this segment, it is identified that both the positional control and the mechanical control are valid as the motion control method and the interference permission setting 002 for permitting only interference between the object in the work space and the movable body 128 is applied.

In a segment from GP' of FIG. 7D to GPclose of FIG. 7E, the control planner 334 plans motion control using the mechanical control based on the reaction force received from the object O by the object O. In this segment, because the pincher 120 pinches the object O, the interference calculator 336 permits the interference of the entire pincher 120 (i.e., the pinching hand body 126 and the movable body 128). Also, in FIGS. 5 and 6, in this segment, it is identified that mechanical control is valid as the motion control method and interference permission setting 003 for permitting any interference is applied.

In a segment from GPclose of FIG. 7E to GAP3 of FIG. 7F, the control planner 334 plans motion control using the positional control with the waypoint GAP3 as the target position. In this segment, because the pincher 120 continuously pinches the object O, the interference calculator 336 permits the interference of the entire pincher 120. Also, in FIGS. 5 and 6, in this segment, it is identified that the positional control is valid as the motion control method and the interference permission setting 003 for permitting all types of interference is applied.

Next, a case where the pincher 120 releases the object O within the transport destination container V2 will be described with reference to FIGS. 8A to 8F.

Figure 8A:
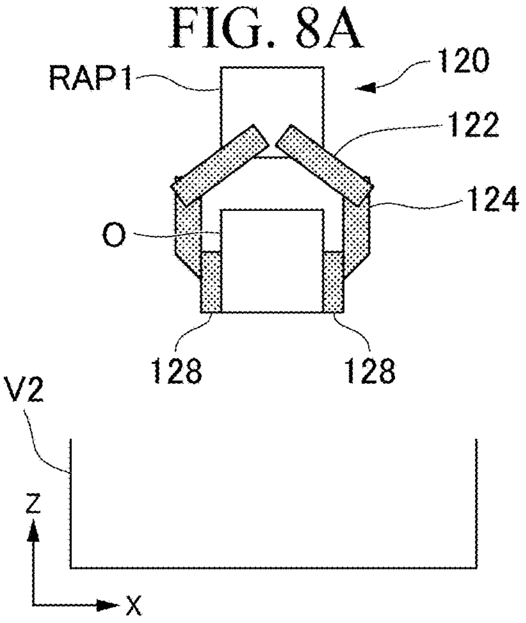
FIG. 8A is a schematic diagram showing an example of a route planning process of a release motion of the pincher according to the embodiment.

FIG. 8A shows a waypoint RAP1 positioned above the transport destination container V2 in a state in which the object O is held by the pincher 120.

Figure 8B:
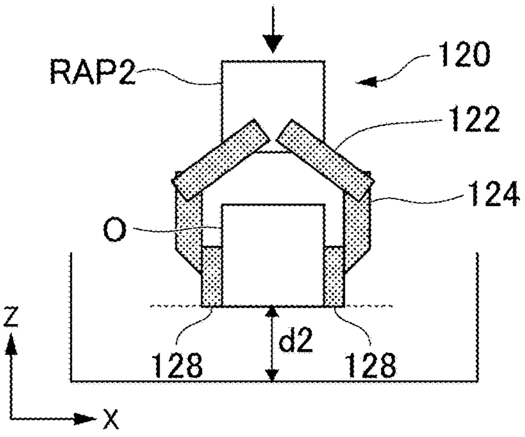
FIG. 8B is a schematic diagram showing an example of a route planning process of a release motion of the pincher according to the embodiment.

FIG. 8B shows a waypoint RAP2 where the pincher 120 is positioned at a predetermined distance d2 from the bottom surface of the transport destination container V2. The waypoint RAP2 is a point where the pincher 120 is regarded to be positioned sufficiently near the bottom surface of the transport destination container V2.

Figure 8C:
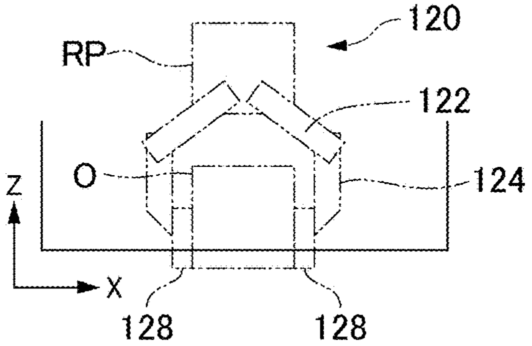
FIG. 8C is a schematic diagram showing an example of a route planning process of a release motion of the pincher according to the embodiment.

FIG. 8C shows a virtual waypoint RP set as a target position immediately before the pincher 120 releases the object O. The positional control of the pincher 120 is performed such that the pincher 120 moves from a waypoint RAP2 of FIG. 8B toward a waypoint RP which is a target position. However, as shown in FIG. 5, movement from the waypoint RAP2 to the waypoint RP is performed together with mechanical control as described below as well as the positional control.

Figure 8D:
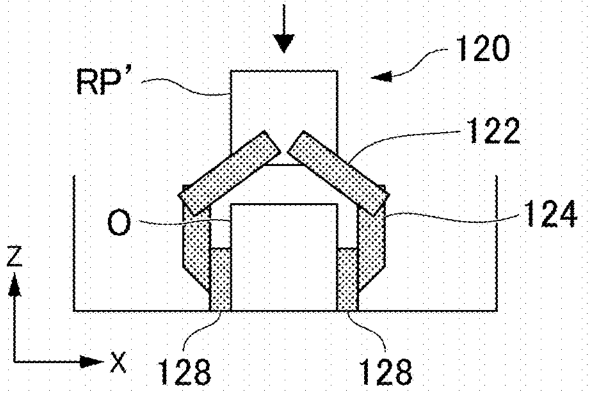
FIG. 8D is a schematic diagram showing an example of a route planning process of a release motion of the pincher according to the embodiment.

FIG. 8D shows a waypoint RP' after the pincher 120 is moved from the waypoint RAP2 of FIG. 8B according to positional control and mechanical control. For example, in a case where the tip of the pincher 120 or the bottom surface of the object O is in contact with the bottom surface of the transport destination container V2, the pincher sensor 24 detects a force applied from the bottom surface of the transport destination container V2 or the object O to the pincher 120. In a case where this force reaches a predetermined value in a process from the waypoint RAP2 to the waypoint RP according to the positional control, the movement of the pincher 120 is stopped at that time even before the arrival at the target position RP. The stop position is set to a position RP' immediately before the pincher 120 releases the object O.

On the other hand, in a case where the pincher 120 reaches the waypoint RP which is a target position before the force detected by the pincher sensor 24 reaches the predetermined value, the movement of the pincher 120 is stopped at that time. The stop position becomes a position RP' immediately before the pincher 120 releases the object O. In this case, RP' is consistent with the waypoint RP set as the target position. That is, the position RP' is a position that the pincher 120 actually reaches according to the combined use of the positional control and the mechanical control.

Thus, the control planner 334 plans the combined use of the positional control and the mechanical control in which the pincher 120 continues the movement toward the target position RP until the pincher 120 reaches the target position RP or until the force detected by the pincher sensor 24 reaches a predetermined value. FIG. 8D shows the waypoint RP' when the force detected by the pincher sensor 24 reaches the predetermined value before the pincher 120 reaches the target position RP. The movable body 128 is in contact with the bottom surface of the transport destination container V2 together with the object O and moves to slide in the +Z-direction with respect to the pinching claw 124. That is, at a waypoint RP' of FIG. 8D, the movable body 128 is pushed toward the pinching hand body 126 by the bottom surface of the transport destination container V2. Thereby, the movable body 128 can absorb an impact when the pincher 120 and the object O are in contact with the bottom surface of the transport destination container V2.

For example, as shown in FIG. 8C, a part of the target position RP can be set to a position deeper than the bottom surface of the transport destination container V2. Thus, as shown in FIG. 8D, it is possible to stop the movement of the pincher 120 while causing the movable body 128 to absorb an impact received from the bottom surface of the transport destination container V2 by the pincher 120 and the object O at the position RP' in front of (i.e., above) the target position RP according to the mechanical control. Thereby, the motion of the pincher 120 can be precisely controlled in the vicinity of a release position having a relatively high possibility of physical interference.

Figure 8E:
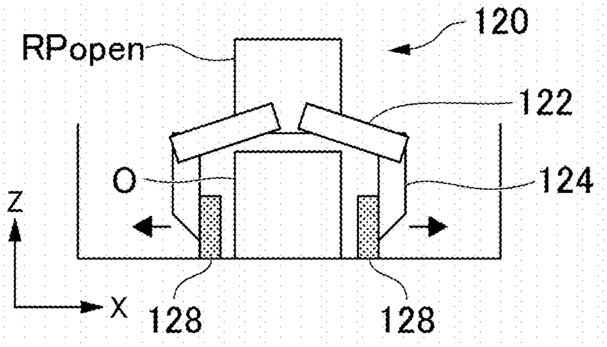
FIG. 8E is a schematic diagram showing an example of a route planning process of a release motion of the pincher according to the embodiment.

FIG. 8E shows a waypoint RPopen when the pincher 120 releases the object O. At the waypoint RPopen, the pincher 120 releases the object O by the movement of the plurality of pinching claws 124 in a direction away from the object O. The motion of the pinching claw 124 is controlled on the basis of a magnitude of the reaction force from the object O detected by the pincher sensor 24. That is, the control planner 334 plans the mechanical control for continuing a spreading motion for opening the pinching claw 124 outward by the pincher 120 until the magnitude of the reaction force received from the object O by the pincher 120 reaches zero. In addition, the pincher 120 may continue the spreading motion for a predetermine time period even after the magnitude of the reaction force becomes zero to reliably release the object O.

Figure 8F:
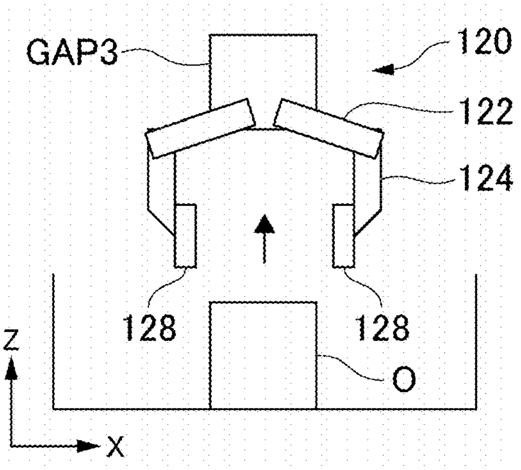
FIG. 8F is a schematic diagram showing an example of a route planning process of a release motion of the pincher according to the embodiment.

FIG. 8F shows a waypoint RAP3 when the pincher 120 is separated from the transport destination container V2. The waypoint RAP3 is a position above the transport destination container V2. In this case, the movable body 128 moving to slide in the +Z-direction with respect to the pinching claw 124 in FIG. 8D can be returned to the original position by moving to slide in the −Z-direction with respect to the pinching claw 124.

In a segment from RAP1 of FIG. 8A to RAP2 of FIG. 8B, the control planner 334 plans motion control using positional control in which the waypoint RAP2 is designated as the target position. In this segment, because the pincher 120 holds the object O, the interference calculator 336 permits the interference of the entire pincher 120. Also, in FIGS. 5 and 6, in this segment, it is identified that positional control is valid as the motion control method and interference permission setting 003 for permitting all types of interference is applied.

In a segment from RAP2 of FIG. 8B to RP' of FIG. 8D, the control planner 334 plans motion control in which positional control with a waypoint RP as a target position and mechanical control based on a reaction force received by the movable body 128 from the bottom surface of the transport destination container V2 are used in combination. In this segment, because the pincher 120 holds the object O, the interference calculator 336 permits the interference of the entire pincher 120. Also, in FIGS. 5 and 6, in this segment, it is identified that both the positional control and the mechanical control are valid as the motion control method and interference permission setting 003 for permitting all types of interference is applied.

In a segment from RP' of FIG. 8D to RPopen of FIG. 8E, the control planner 334 plans motion control using mechanical control based on a reaction force received from the object O by the object O. In this segment, because the object O is released from a state in which the object O is held by the pincher 120, the interference calculator 336 permits the interference of the entire pincher 120. Also, in FIGS. 5 and 6, in this segment, it is identified that mechanical control is valid as the motion control method and interference permission setting 003 for permitting only interference between an object within the work space and the movable body 128 is applied.

In a segment from RPopen of FIG. 8E to RAP3 of FIG. 8F, the control planner 334 plans motion control using the positional control with the waypoint RAP3 as the target position. In this segment, because the pincher 120 is close to the bottom surface of the transport destination container V2 and the object O, the interference calculator 336 permits only the interference of the movable body 128 provided on the tip portion of the pincher 120. Also, in FIGS. 5 and 6, in this segment, it is identified that positional control is valid as the motion control method and interference permission setting 002 for permitting only interference between an object within the work space and the movable body 128 is applied. In a segment after RAP3, the interference calculator 336 does not permit interference of the entire pincher 120.

Next, a case where the adsorber 140 holds the object O in the extraction source container V1 will be described with reference to FIGS. 9A to 9E.

Figure 9A:
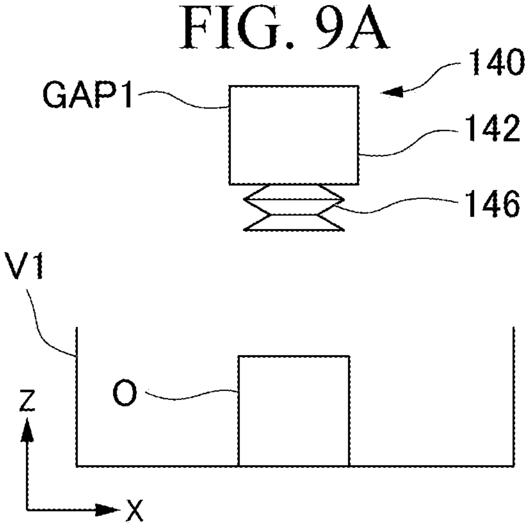
FIG. 9A is a schematic diagram showing an example of a route planning process of a holding motion of the adsorber according to the embodiment.

FIG. 9A shows a waypoint GAP1 at which the adsorber 140 is positioned above the extraction source container V1. The adsorber 140 is positioned just above the object O to be held.

Figure 9B:
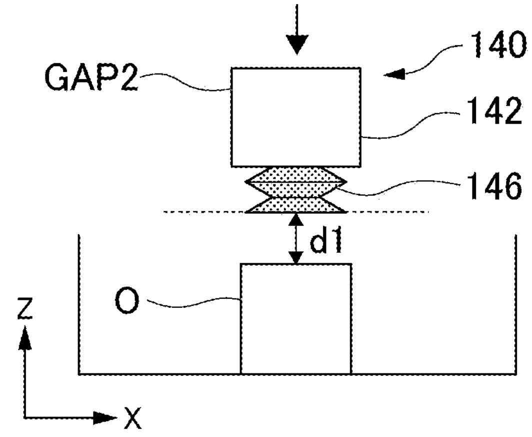
FIG. 9B is a schematic diagram showing an example of a route planning process of a holding motion of the adsorber according to the embodiment.

FIG. 9B shows a waypoint GAP2 at which the adsorber 140 is positioned at a predetermined distance d1 from the object O to be held. The waypoint GAP2 is a point at which the adsorber 140 is regarded to be positioned sufficiently near the object O.

Figure 9C:
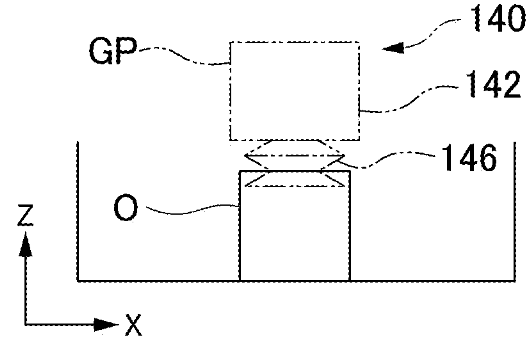
FIG. 9C is a schematic diagram showing an example of a route planning process of a holding motion of the adsorber according to the embodiment.

FIG. 9C shows a virtual waypoint GP set as a target position for the adsorber 140 to grasp the object O. The positional control of the adsorber 140 is performed such that the adsorber 140 moves from the waypoint GAP2 of FIG. 9B toward the waypoint GP which is the target position. However, movement from the waypoint GAP2 to the waypoint GP is performed together with the mechanical control as described below as well as the positional control.

Figure 9D:
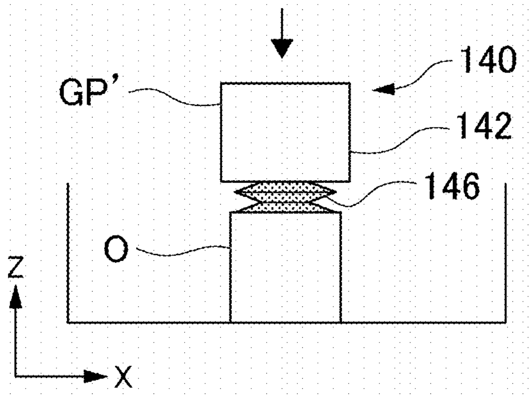
FIG. 9D is a schematic diagram showing an example of a route planning process of a holding motion of the adsorber according to the embodiment.

FIG. 9D shows a waypoint GP' after the adsorber 140 is moved from the waypoint GAP2 of FIG. 9B according to positional control and mechanical control. For example, the adsorber sensor 26 detects a force received by the adsorption pad 146 from the object O, a distortion amount, a deformation amount, an internal pressure, and a suction flow rate change of the adsorption pad 146, and the like. In a process from the waypoint GAP2 to a waypoint GP according to the positional control, if it is determined that the adsorber 140 has adsorbed and held the object O on the basis of a detection result of the adsorber sensor 26, even before the object O reaches the target position GP, the movement of the adsorber 140 is stopped at that time. The stop position becomes the position GP' where the adsorber 140 adsorbs the object O. For example, in a case where the adsorber sensor 26 detects a force received by the adsorption pad 146 from the object O, it can be determined that the adsorber 140 has adsorbed and hold the object O if the force increases and reaches a predetermined value. In a case where the adsorber sensor 26 detects the distortion amount or the deformation amount of the adsorption pad 146, it can be determined that the adsorber 140 has adsorbed and held the object O if the detected distortion amount or the detected deformation amount increases and reaches the predetermined value. In a case where the adsorber sensor 26 detects a change in the internal pressure or the suction flow rate of the adsorption pad 146, it can be determined that the adsorber 140 has adsorbed and held the object O if the detected internal pressure or the flow rate changes decrease and reach a predetermined value.

On the other hand, in a case where the adsorber 140 reaches the waypoint GP which is the target position before it is determined that the adsorber 140 adsorbs and holds the object O from the detection result of the adsorber sensor 26, the movement of the adsorber 140 is stopped at that time. The stop position becomes the position GP' where the adsorber 140 adsorbs the object O. In this case, GP' is consistent with the waypoint GP set as the target position. That is, the position GP' is a position that the adsorber 140 actually reaches according to the combined use of the positional control and the mechanical control. In a case where it is determined that the adsorber 140 has not adsorbed and held the object O from the detection result of the adsorber sensor 26 even though the adsorber 140 has reached the waypoint GP-GP', the adsorber 140 may be controlled to perform a further approach to the object O and perform an adsorption motion by further executing the mechanical control based on the detection result of the adsorber sensor 26.

Thus, the control planner 334 plans the combined use of positional control and mechanical control in which the adsorber 140 continues the movement toward the target position GP until the adsorber 140 reaches the target position GP or until it is determined that the adsorber 140 has adsorbed and held the object O from the detection result of the adsorber sensor 26. FIG. 9D shows a waypoint GP' when it is determined that the adsorber 140 has adsorbed and held the object O before the adsorber 140 reaches the target position GP. The adsorption pad 146 comes into contact with the upper surface of the object O and is compressed and deformed between the adsorption hand body 142 and the object O. That is, at the waypoint GP' of FIG. 9D, the adsorption pad 146 is pushed toward the adsorption hand body 142 by the object O. Thereby, the adsorption pad 146 can absorb an impact when the adsorber 140 comes into contact with the object O.

For example, as shown in FIG. 9C, a part of the target position GP can be set to a position deeper than the upper surface of the object O. Thereby, as shown in FIG. 9D, it is possible to stop the movement of the adsorber 140 while causing the adsorption pad 146 to absorb the impact received from the upper surface of the object O by the adsorber 140 at the position GP' in front of (i.e., above) the target position GP according to the mechanical control. Thereby, it is possible to precisely control the motion of the adsorber 140 in the vicinity of the object O having a comparatively high possibility of physical interference.

Figure 9E:
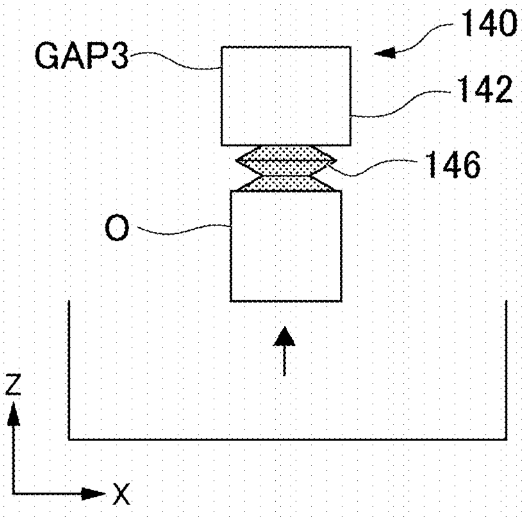
FIG. 9E is a schematic diagram showing an example of a route planning process of a holding motion of the adsorber according to the embodiment.

FIG. 9E shows a waypoint GAP3 when the adsorber 140 picks up the object O while adsorbing and holding the object O and separates the object O from the extraction source container V1. The waypoint GAP3 is a position above the extraction source container V1 and the adsorber 140 is in a state in which the object O is adsorbed and held by the adsorption pad 146. At this time, the adsorption pad 146, which is compressed and deformed between the adsorption hand body 142 and the object O in FIG. 9D, can be returned to the original shape by the weight of the object O.

In a segment from GAP1 of FIG. 9A to GAP2 of FIG. 9B, the control planner 334 plans motion control using the positional control with the waypoint GAP2 as the target position. In this segment, because the adsorber 140 is separated from the object O to some extent, the interference calculator 336 does not permit the interference of the entire adsorber 140.

In a segment from GAP2 of FIG. 9B to GP' of FIG. 9D, the control planner 334 plans motion control using the combined use of positional control with a waypoint GP as a target position and mechanical control based on a physical quantity detected by the adsorber sensor 26. In this segment, because the adsorption pad 146 of the adsorber 140 is in proximity to or in contact with the object O, the interference calculator 336 permits the interference of the adsorption pad 146. As described above, in a case where it is determined that the adsorber 140 has not adsorbed and held the object O even at the waypoint GP', the control planner 334 can further plan motion control using mechanical control based on the physical quantity detected by the adsorber sensor 26.

In a segment from GP' of FIG. 9D to GAP3 of FIG. 9E, the control planner 334 plans motion control using positional control with the waypoint GAP3 as the target position. In this segment, because the adsorption pad 146 continues the adsorption and holding of the object O, the interference calculator 336 permits interference of the adsorption pad 146.

Next, a case where the adsorber 140 releases the object O in the transport destination container V2 will be described with reference to FIGS. 10A to 10E.

Figure 10A:
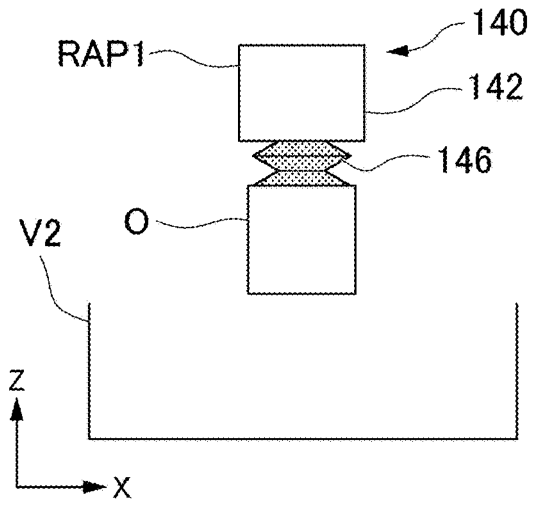
FIG. 10A is a schematic diagram showing an example of a route planning process of a release motion of the adsorber according to the embodiment.

FIG. 10A shows a waypoint RAP1 positioned above the transport destination container V2 in a state in which the adsorber 140 holds the object O.

Figure 10B:
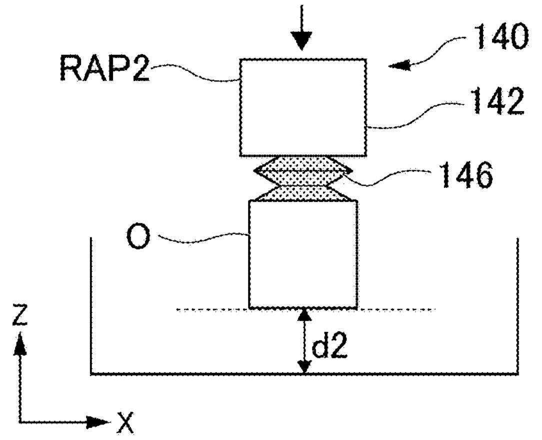
FIG. 10B is a schematic diagram showing an example of a route planning process of a release motion of the adsorber according to the embodiment.

FIG. 10B shows a waypoint RAP2 where the bottom surface of the object O is positioned at a predetermined distance d2 from the bottom surface of the transport destination container V2. The waypoint RAP2 is a point at which the adsorber 140 can be regarded to be positioned sufficiently near the bottom surface of the transport destination container V2.

Figure 10C:
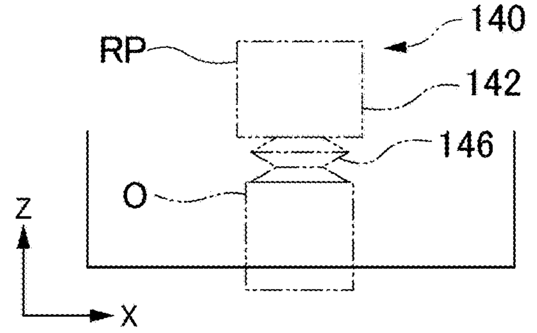
FIG. 10C is a schematic diagram showing an example of a route planning process of a release motion of the adsorber according to the embodiment.

FIG. 10C shows a virtual waypoint RP set as a target position for the adsorber 140 to release the object O. The positional control of the adsorber 140 is performed such that the adsorber 140 moves from a waypoint RAP2 of FIG. 10B toward the waypoint RP which is the target position. However, movement from the waypoint RAP2 to the waypoint RP is performed together with the mechanical control as described below as well as the positional control.

Figure 10D:
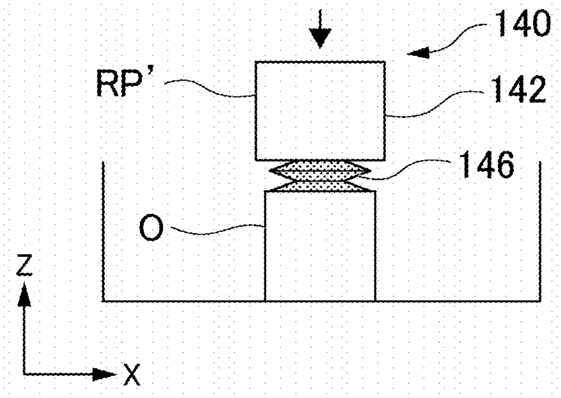
FIG. 10D is a schematic diagram showing an example of a route planning process of a release motion of the adsorber according to the embodiment.

FIG. 10D shows a waypoint RP' after the adsorber 140 is moved from the waypoint RAP2 of FIG. 10B according to positional control and mechanical control. For example, the adsorber sensor 26 detects a force received by the adsorption pad 146 from the object O, a distortion amount, a deformation amount, an internal pressure, and a suction flow rate change of the adsorption pad 146, and the like. In a process from the waypoint RAP2 to a waypoint RP according to the positional control, in a case where it is determined that the object O has come into contact with the bottom surface of the transport destination container V2 on the basis of a detection result of the adsorber sensor 26, even before the object O reaches the target position RP, the movement of the adsorber 140 is stopped at that time. The stop position becomes the position RP' immediately before the adsorber 140 releases the object O. For example, in a case where the adsorber sensor 26 detects a force received by the adsorption pad 146 from the object O, it can be determined that the object O has come into contact with the bottom surface of the transport destination container V2 if the force increases and reaches a predetermined value. In a case where the adsorber sensor 26 detects the distortion amount or the deformation amount of the adsorption pad 146, it can be determined that the object O has come into contact with the bottom surface of the transport destination container V2 if the detected distortion amount or the detected deformation amount increases and reaches the predetermined value.

On the other hand, in a case where the adsorber 140 reaches the waypoint RP which is a target position before it is determined that the object O has come into contact with the bottom surface of the transport destination container V2 from the detection result of the adsorber sensor 26, the movement of the adsorber 140 is stopped at that time. The stop position becomes the position RP' immediately before the adsorber 140 releases the object O. In this case, RP' is consistent with the waypoint RP set as the target position. That is, the position RP' is a position that the adsorber 140 actually reaches according to the combined use of the positional control and the mechanical control. In a case where it is determined that the object O has not come into contact with the bottom surface of the transport destination container V2 from the detection result of the adsorber sensor 26 even though the adsorber 140 has reached the waypoint RP=RP', the adsorber 140 may be controlled to further approach the bottom surface of the transport destination container V2 by further executing the mechanical control based on the detection result of the adsorber sensor 26.

Thus, the control planner 334 plans the combined use of positional control and mechanical control in which the adsorber 140 continues the movement toward the target position RP until the adsorber 140 reaches the target position RP or until it is determined that the object O has come into contact with the bottom surface of the transport destination container V2 from the detection result of the adsorber sensor 26. In FIG. 10D, a waypoint RP' when it is determined that the object O has come into contact with the bottom surface of the transport destination container V2 before the adsorber 140 reaches the target position RP is shown. The adsorption pad 146 is compressed and deformed between the adsorption hand body 142 and the object O. That is, at the waypoint RP' in FIG. 10D, the adsorption pad 146 is pushed toward the adsorption hand body 142 by the object O. Thereby, the adsorption pad 146 can absorb an impact when the object O has come into contact with the bottom surface of the transport destination container V2. Subsequently, the control planner 334 can plan motion control of turning off the suction of the suction device 144 at the waypoint RP', as a control plan after the adsorber 140 reaches the waypoint RP', in order to cause the adsorber 140 to leave the transport destination container V2.

For example, as shown in FIG. 10C, a part of the target position RP can be set to a position deeper than the bottom surface of the transport destination container V2. Thereby, as shown in FIG. 10D, it is possible to stop the movement of the adsorber 140 while causing the adsorption pad 146 to absorb the impact received from the bottom surface of the transport destination container V2 by the object O at the position RP' in front of (i.e., above) the target position RP according to the mechanical control. Thereby, it is possible to precisely control the motion of the adsorber 140 in the vicinity of the bottom surface of the transport destination container V2 having a comparatively high possibility of physical interference.

Figure 10E:
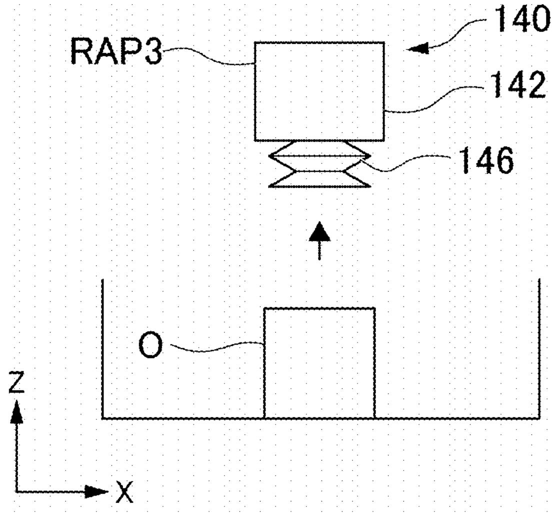
FIG. 10E is a schematic diagram showing an example of a route planning process of a release motion of the adsorber according to the embodiment.

FIG. 10E shows a waypoint RAP3 when the adsorber 140 is separated from the transport destination container V2. The waypoint RAP3 is a position above the transport destination container V2. At this time, the adsorption pad 146, which is compressed and deformed between the adsorption hand body 142 and the object O in FIG. 10D, can be returned to the original shape by a restoring force of the adsorption pad 146 itself.

In a segment from RAP1 of FIG. 10A to RAP2 of FIG. 10B, the control planner 334 plans motion control using positional control with the waypoint RAP2 as a target position. In this segment, because the adsorption pad 146 has held the object O, the interference calculator 336 permits the interference of the adsorption pad 146.

In a segment from RAP2 of FIG. 10B to RP' of FIG. 10D, the control planner 334 plans motion control using the combined use of positional control with the waypoint RP as a target position and mechanical control based on a physical quantity detected by the adsorber sensor 26. In this segment, because the adsorption pad 146 has held the object O, the interference calculator 336 permits the interference of the adsorption pad 146. As described above, in a case where it is determined that the object O has not come into contact with the bottom surface of the transport destination container V2 even at the waypoint RP', the control planner 334 can further plan motion control using the mechanical control based on the physical quantity detected by the adsorber sensor 26.

In a segment from RP' of FIG. 10D to RAP3 of FIG. 10E, the control planner 334 plans motion control using positional control with a waypoint RAP3 as a target position. In this segment, because the adsorption pad 146 approaches the object O, the interference calculator 336 permits the interference of the adsorption pad 146. In a segment after RAP3, the interference calculator 336 does not permit interference of the entire adsorber 140.

Thus, the planner 310 can generate a holding plan for the object O in the handling device 10 such that the problem of physical interference of the holder 100 is sufficiently suppressed.

The executor 340 instructs the handling device 10 to hold the object O on the basis of the holding plan generated by the planner 310, thereby executing the holding motion on the object O. Specifically, the executor 340 includes the motion controller 342. The motion controller 342 performs motion control for the first movable arm 110 and the pincher 120 of the first handling device 12 and the second movable arm 130 and the adsorber 140 of the second handling device 14 on the basis of the holding plan. Specifically, the motion controller 342 issues instructions to the first handling device 12 and the second handling device 14 to cause the pincher 120 and the adsorber 140 to execute a holding motion for the holding region of the object O within the extraction source container V1, a transport motion from the extraction source container V1 to the transport destination container V2, and a release motion for the object O in the transport destination container V2.

The storage 350 stores a program 352 for the control device 30, the plan table 354, the interference permission setting table 356, and various types of data for controlling the motion of the handling device 10. More specifically, in addition to the program 352, the storage 350 stores device data including a type, property, and the like of the holder 100 of the handling device 10, order data including order information received from the user or the management device 40, object data including information on a type, shape, property, or the like of the object O, image data acquired by the movement source sensor 20 and the movement destination sensor 22, holder sensor data acquired by the pincher sensor 24 and the adsorber sensor 26, plan data including a holding plan such as a route and control content generated by the planner 310, history data including a control history and the like of the handling device 10, and the like.

The management device 40 manages an operation situation of the handling device 10, order information, an inventory situation for objects O, and the like. For example, the management device 40 can receive order information from the user and transmit the order information to the handling device 10 and the control device 30. The management device 40 may generate one or more picking lists for the handling device 10 on the basis of the order information. The control device 30 can feed back information such as a control history and an operation result of the handling device 10 to the management device 40.

Each of the functional portions such as the acquirer, the planner, the executor, and the storage described in the above-described example is a functional portion implemented by a hardware configuration including a processor, a memory, a storage, an input/output interface, a communication interface, a bus for interconnecting them, and the like provided in the control device in cooperation.

Next, an operation process of the handling system 1 will be described with reference to FIGS. 11 and 12.

Figure 11:
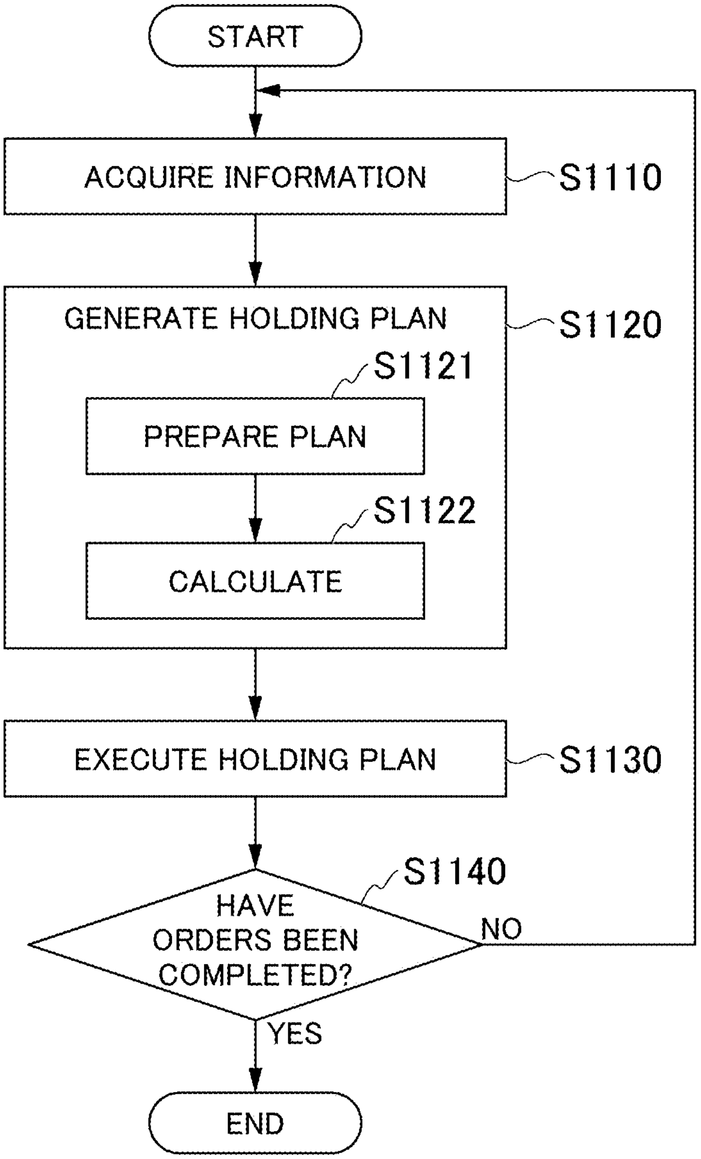
FIG. 11 is a flowchart showing an operation flow of a handling system according to the embodiment.

FIG. 11 is a flowchart showing an operation flow of the handling system 1 according to the embodiment.

Figure 12:
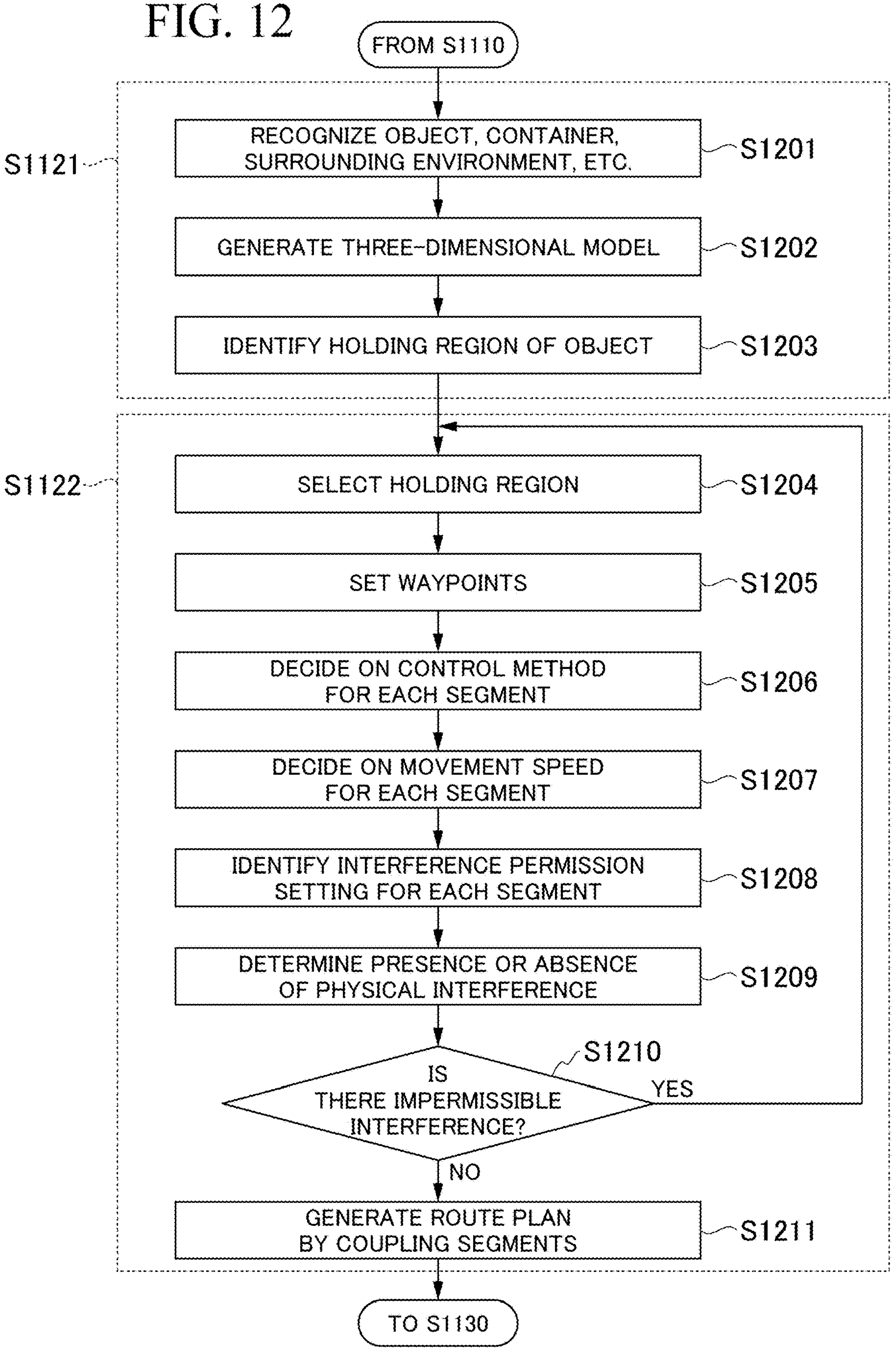
FIG. 12 is a flowchart showing an operation flow of a planning process of the handling system according to the embodiment.

FIG. 12 is a flowchart showing an operation flow of a planning process of the handling system 1 according to the embodiment.

First, a flow of an overall process of the handling system 1 will be described with reference to FIG. 11. As shown in FIG. 11, first, in step S1110, the acquirer 300 acquires order information from the management device 40 or the user, information about a type, shape, and the like of an object O, detection results of the sensors 20 to 26 (e.g., image data of the object O within the extraction source container V1), and the like. Subsequently, in step S1120, the planner 310 generates a holding plan for the holder 100 to hold the object O. Specifically, step S1120 includes steps S1121 and S1122. In step S1121, the plan preparer 320 processes information acquired by the acquirer 300 for calculation for a holding plan. In step S1122, the calculator 330 performs various types of calculations for generating the holding plan on the basis of the information processed by the plan preparer 320. Subsequently, at step S1130, the executor 340 holds the object O on the basis of the decided holding plan and instructs the handling device 10 to move the object O from the extraction source container V1 to the transport destination container V2. After the grasping and transport motions on the object O in the handling device 10 are completed, the control device 30 determines whether or not all orders have been completed in a step S1140. In a case where it is determined that the orders have not been completed (S1140: NO), information is acquired by the acquirer 300 again (S1110). In a case where it is determined that all orders have been completed (S1140: YES), the control device 30 ends the control of the handling device 10.

Next, specific processing content in the plan preparation step S1121 and the calculation step S1122 will be described in detail with reference to FIG. 12.

As shown in FIG. 12, first, in step S1201, the recognizer 322 recognizes and identifies an object O in an image, containers V1 and V2, obstacles in a surrounding environment, and the like in a known image recognition process. In step S1202, the model generator 324 generates a three-dimensional model of the object O recognized by the recognizer 322, the containers V1 and V2, the obstacles in the surrounding environment and the like. In step S1203, the region identifier 326 identifies a region where the object O can be held by the holder 100 on the basis of a result of the recognition process and/or the generated three-dimensional model.

Subsequently, in step S1204, the region identifier 326 selects a holding region serving as a holding motion target. The region identifier 326 may select the target holding region in accordance with a priority level decided on in a known evaluation method. Subsequently, in step S1205, the route planner 332 sets position information of each waypoint and orientation information of the holder 100 at each waypoint on the basis of the result of the recognition process and/or the generated three-dimensional model. The route planner 332 generates a segment route between the two waypoints by connecting the two waypoints.

In step S1206, the control planner 334 decides on the motion control method of the holder 100 for each segment with reference to the plan table 354. In step S1207, the control planner 334 decides on a movement speed of the holder 100 for each segment. For example, the control planner 334 performs positional control and sets the movement speed of the holder 100 to a first movement speed in a first segment in which mechanical control is not performed. The control planner 334 sets the movement speed of the holder 100 to a second movement speed lower than the first movement speed in a second segment where both the positional control and the mechanical control are performed. The control planner 334 performs the mechanical control and sets the movement speed of the holder 100 to a third movement speed lower than the second movement speed in a third segment where positional control is not performed.

In step S1208, the interference calculator 336 identifies an interference permission setting to be used for each segment with reference to the interference permission setting table 356. In step S1209, the interference calculator 336 determines the presence or absence of physical interference for each segment in accordance with the interference permission setting. In a case where it is determined that there is physical interference in a certain segment and the interference is not permitted in the interference permission setting of the segment, the interference calculator 336 determines that there is impermissible interference (S1210: YES). In this case, the process returns to step S1204 and the region identifier 326 selects another holding region. On the other hand, in a case where the interference calculator 336 determines that there is no impermissible interference across all segments (S1210: NO), the route planner 332 generates a route plan including information of all movement routes by coupling the respective segment routes in step S1211. Subsequently, the process proceeds to step S1130 and the executor 340 executes a holding plan on the basis of the generated route plan. In addition, after a route plan generation process and an interference check process are performed for a plurality of holding regions or all holding regions, the planner 310 may identify a route plan to be executed by scoring a plurality of route plans that have been generated.

In the handling system 1 according to the above-described embodiment, an interference permitter being displaceable or deformable with respect to the main body of the holder 100 is provided and physical interference of the interference permitter in a specific segment of the movement route is permitted. A process of switching between whether or not to permit interference for each part of the holder 100 as described above is performed and therefore a more detailed holding plan can be generated in comparison with a case where a target for switching between whether or not to permit interference is the whole holder 100. As a result, the more precise handling operation can be implemented.

According to an embodiment, the interference permitters 128 and 146 are provided on the tip portion of the pincher 120. According to an embodiment, the holder 100 includes a pinching hand configured to pinch the object O, the pinching hand has the pinching hand body 126 and the interference permitter 128, and the interference permitter 128 is attached to the pinching hand body 126 such that the interference permitter 128 can be displaced with respect to the pinching hand body 126 in a direction intersecting a pinching direction of the pinching hand. With such a configuration, because the interference permitters 128 and 146 displaceably or deformably attached to the main bodies 126 and 142 are provided on a tip portion of the holder 100 that normally initially comes into contact with the object O or the containers V1 and V2, it is possible to mitigate or absorb the impact at the tip portion.

According to an embodiment, the control device 30 switches a mode among (a) a movement mode which is applicable to a segment where the holder 100 moves at a specific distance or more from the object O, (b) an intermediate mode which is applicable to a segment where the holder 100 moves at a distance less than the specific distance from the object O, and (c) a holding mode which is applicable to a segment where the holder 100 performs a holding motion on the object O, as a method of controlling the holder 100. According to this configuration, the motion after the holder 100 approaches the object O can be divided into the intermediate mode in which the holder 100 significantly moves to a certain degree and the holding mode in which careful motion control is required for holding the object O. Therefore, more precise and/or efficient motion control becomes possible.

According to an embodiment, the control device 30 controls the motion of the holder 100 in the intermediate mode in a specific segment. According to an embodiment, the control device 30 determines the presence or absence of physical interference between the main bodies 126 and 142 and the interference permitters 128 and 146 in the movement mode. According to an embodiment, the control device 30 permits physical interference between the main bodies 126 and 142 and the interference permitters 128 and 146 in the holding mode. With such a configuration, the interference calculator 336 permits only interference of the interference permitters 128 and 146 in a state in which the holder 100 approaches the object O. Because the interference permitters 128 and 146 are displaceable or deformable with respect to the body of the holder 100, it is not necessary to plan to uniformly avoid interference even if the holder 100 approaches the object O. Therefore, the degree of freedom of the holding plan can be improved.

According to an embodiment, the control device 30 performs positional control for controlling the motion of the holder 100 to cause the holder 100 to move to the target position and mechanical control for controlling the motion of the holder 100 on the basis of a mechanical physical quantity acting on the holder 100 in the intermediate mode. According to an embodiment, the control device 30 performs positional control for controlling the motion of the holder 100 to cause the holder 100 to move to the target position in the movement mode. According to an embodiment, the control device 30 performs a mechanical control for controlling the motion of the holder 100 on the basis of the mechanical physical quantity acting on the holder 100 in the holding mode. Generally, because physical interference may occur in a region where the holder 100 approaches the object O, the motion control method of the holder 100 is often switched from the positional control to the mechanical control. However, in a case where the mechanical control is performed, the movement is performed at a lower speed than that in the positional control. On the other hand, according to the above-described configuration, the handling operation can be speeded up by the combined use of the positional control and the mechanical control even in a region where the holder 100 is close to the object O. Moreover, it is possible to perform a precise holding motion and a precise release motion by switching the interference permission setting in accordance with the mode switching.

According to an embodiment, the control device 30 sets the movement speed of the holder 100 to a first movement speed in the movement mode and sets the movement speed of the holder 100 to a second movement speed lower than the first movement speed in the intermediate mode. According to an embodiment, the control device 30 sets the movement speed of the holder 100 to a third movement speed lower than the second movement speed in the holding mode. With this configuration, the intermediate mode in which the holder 100 moves at an intermediate speed can be set between the movement mode in which the holder 100 moves at a high speed and the holding mode in which the holder 100 moves at a low speed. Thus, the handling operation can be speeded up as a whole.

Although the planner 310 generates a holding plan with reference to the plan table 354 and the interference permission setting table 356 stored in the storage 350 of the control device 30 in the above-described embodiment, the plan table 354 and/or the interference permission setting table 356 may be stored in an external storage device or a cloud server connected to the control device 30 by wire or wirelessly and the like.

A process of generating the holding plan in the planner 310 is not limited to a rule-based process using the plan table 354 and the interference permission setting table 356 as described above and machine learning models and the like can be used as needed.

In each embodiment, it is assumed that the process of the control device 30 is implemented with program software within an external storage device such as a memory using one or more processors such as a central processing unit (CPU), but may be implemented with hardware (e.g., a circuit part; circuitry) which does not use the CPU. Moreover, the process may be executed via a cloud server.

An instruction indicated in the processing procedure shown in each embodiment can be executed on the basis of a program which is software. A general-purpose computer system can obtain an effect similar to the effect of the processing procedure by reading the program stored in advance. The instructions described in each embodiment are recorded on a magnetic disc (a flexible disc, a hard disc, or the like), an optical disc (a CD-ROM, a CD-R, a CD-RW, a DVD-ROM, a DVD+R, a DVD+RW, a Blu-ray (registered trademark) disc, or the like), a semiconductor memory, or a recording medium similar thereto as a program which can be executed by a computer. If a computer or a built-in system is a readable recording medium, its storage form may be any form. The computer reads the program from the recording medium and executes instructions described in the program by the CPU on the basis of the program, thereby implementing an operation similar to the processing procedure. The computer may acquire or read the program through a network.

An operating system (OS) operating on the computer, database management software, middleware (MW) such as a network, or the like may execute a part of the processing procedure on the basis of the instructions of the program installed in the computer or a built-in system from the recording medium. A recording medium in each embodiment includes not only a medium independent of a computer and a built-in system but also a recording medium in which a program transmitted through a LAN, the Internet, or the like is downloaded and stored or temporarily stored. The recording medium may be not limited to one type and the process may be executed from a plurality of media.

Such a recording medium may have any configuration.

A computer or a built-in system in each embodiment is used for executing each process in each embodiment on the basis of a program stored in a recording medium and may have any configuration of a single device such as a personal computer or a microcomputer, or a system to which a plurality of devices are connected via a network. A computer in each embodiment is not limited to a personal computer and is a generic term for equipment and devices including an arithmetic processing device, a microcomputer, and the like included in an information processing device and capable of implementing functions in each embodiment using a program.

According to at least one embodiment described above, it is possible to improve the precision of a handling operation by permitting physical interference in a specific segment of a movement route only for the interference permitter of the holder 100.

While several embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

APPENDIX 1

A handling system for handling an object, the handling system including:

a holder including a main body operable to hold the object and an interference permitter displaceably or deformably attached to the main body; and a controller configured to control a motion of the holder, wherein the controller is configured to:

plan a movement route of the holder, determine the presence or absence of physical interference of the holder on at least a part of the planned movement route, and as to a specific segment included in the planned movement route, determine the presence or absence of physical interference of the main body and permit physical interference of the interference permitter.

APPENDIX 2

The handling system according to appendix 1, wherein the interference permitter is provided on a tip portion of the holder.

APPENDIX 3

The handling system according to appendix 1 or 2, wherein the holder includes a pinching hand configured to pinch the object, wherein the pinching hand has the main body and the interference permitter, and wherein the interference permitter is attached to the main body such that the interference permitter can be displaced with respect to the main body in a direction intersecting a pinching direction of the pinching hand.

APPENDIX 4

The handling system according to any one of appendixes 1 to 3, wherein the controller is configured to switch a mode, as a method of controlling the holder, among (a) a movement mode which is applicable to a segment where the holder moves at a specific distance or more from the object, (b) an intermediate mode which is applicable to a segment where the holder moves at a distance less than the specific distance from the object, and (c) a holding mode which is applicable to a segment where the holder performs a holding motion on the object.

APPENDIX 5

The handling system according to appendix 4, wherein the controller is configured to control a motion of the holder in the intermediate mode in the specific segment.

APPENDIX 6

The handling system according to appendix 4 or 5, wherein the controller is configured to determine the presence or absence of physical interference of the main body and the interference permitter in the movement mode.

APPENDIX 7

The handling system according to any one of appendixes 4 to 6, wherein the controller is configured to permit the physical interference of the main body and the interference permitter in the holding mode.

APPENDIX 8

The handling system according to any one of appendixes 4 to 7, wherein the controller is configured to perform, in the intermediate mode:

positional control for controlling a motion of the holder to cause the holder to move to a target position and mechanical control for controlling a motion of the holder on the basis of a mechanical physical quantity acting on the holder.

APPENDIX 9

The handling system according to any one of appendixes 4 to 8, wherein the controller is configured to perform, in the movement mode, positional control for controlling the motion of the holder to cause the holder to move to the target position.

APPENDIX 10

The handling system according to any one of appendixes 4 to 9, wherein the controller is configured to perform, in the holding mode, mechanical control for controlling the motion of the holder on the basis of a mechanical physical quantity acting on the holder.

APPENDIX 11

The handling system according to any one of appendixes 4 to 10, wherein the controller is configured to:

set a movement speed of the holder to a first movement speed in the movement mode, and set the movement speed of the holder to a second movement speed lower than the first movement speed in the intermediate mode.

APPENDIX 12

The handling system according to appendix 11, wherein the controller is configured to set the movement speed of the holder to a third movement speed lower than the second movement speed in the holding mode.

APPENDIX 13

An information processing system for generating a motion plan of a holder having a main body operable to hold an object and an interference permitter displaceably or deformably attached to the main body, the information processing system including a processor, wherein the processor is configured to:

plan a movement route of the holder, determine the presence or absence of physical interference of the holder on at least a part of the planned movement route, and as to a specific segment included in the planned movement route, determine the presence or absence of physical interference of the main body and permit physical interference of the interference permitter.

APPENDIX 14

An information processing system for generating a motion plan of a holder having a main body operable to hold an object and an interference permitter displaceably or deformably attached to the main body, the information processing system including:

a calculator configured to plan control content of the holder on the basis of a plan of a movement route of the holder, wherein the calculator is configured to:

determine the presence or absence of physical interference of the holder on at least a part of the movement route, and as to a specific segment included in the planned movement route, determine the presence or absence of physical interference of the main body and permit physical interference of the interference permitter.

APPENDIX 15

The information processing system according to appendix 14, further including a plan preparer configured to generate models of the holder and the object, wherein the calculator plans a movement route for the model of the holder to hold the model of the object.

APPENDIX 16

An information processing method to be executed by a processor of a computer, the information processing method including a route planning step and an interference determination step, wherein the route planning step includes planning a movement route of a holder having a main body operable to hold an object and an interference permitter displaceably or deformably attached to the main body, and wherein the interference determination step includes determining the presence or absence of physical interference of the holder on at least a part of the planned movement route; and, as to a specific segment included in the planned movement route, determining the presence or absence of physical interference of the main body and permitting physical interference of the interference permitter.

APPENDIX 17

A program for causing a processor of a computer to execute an information processing method, the information processing method including a route planning step and an interference determination step, wherein the route planning step includes planning a movement route of a holder having a main body operable to hold an object and an interference permitter displaceably or deformably attached to the main body, and wherein the interference determination step includes determining the presence or absence of physical interference of the holder on at least a part of the planned movement route; and, as to a specific segment included in the planned movement route, determining the presence or absence of physical interference of the main body and permitting physical interference of the interference permitter.

APPENDIX 18

A non-transitory computer-readable storage medium storing a program for causing a processor of a computer to execute an information processing method, the information processing method including a route planning step and an interference determination step, wherein the route planning step includes planning a movement route of a holder having a main body operable to hold an object and an interference permitter displaceably or deformably attached to the main body, and wherein the interference determination step includes determining the presence or absence of physical interference of the holder on at least a part of the planned movement route; and, as to a specific segment included in the planned movement route, determining the presence or absence of physical interference of the main body and permitting physical interference of the interference permitter.

What is claimed is:

1. A handling system for handling an object, the handling system comprising:

a holder configured to hold the object and capable of a motion moving on a movement route, the holder being composed of a plurality of parts including a main body operable to hold the object and an interference permitter attached to the main body in a manner that allows displacement or deformation in response to physical interference, including contact or collision with others;

a controller configured to control a motion of the holder on the basis of movement modes corresponding to segments on the movement route; and a memory configured to store information of whether or not to permit physical interference of each of the plurality of parts of the holder, including contact or collision with others, in each segment of the movement route, wherein the controller is configured to set whether or not to permit the physical interference of the plurality of parts of the holder for each segment corresponding to each movement mode, on the basis of the information of whether or not to permit the physical interference.

2. The handling system according to claim 1, wherein the interference permitter is provided on a tip portion of the holder.

3. The handling system according to claim 1, wherein the holder includes a pinching hand configured to pinch the object, wherein the pinching hand has the main body and the interference permitter, and wherein the interference permitter is attached to the main body such that the interference permitter can be displaced with respect to the main body in a direction intersecting a pinching direction of the pinching hand.

4. The handling system according to claim 1, wherein the controller is configured to switch a mode, as a method of controlling the holder, among:

(a) a movement mode which is applicable to a segment where the holder moves at a specific distance or more from the object, (b) an intermediate mode which is applicable to a segment where the holder moves at a distance less than the specific distance from the object, and (c) a holding mode which is applicable to a segment where the holder performs a holding motion on the object.

5. The handling system according to claim 4, wherein the controller is configured to control a motion of the holder in the intermediate mode in a specific segment which is set such that the controller determines the presence or absence of physical interference of the main body and permits physical interference of the interference permitter.

6. The handling system according to claim 4, wherein the controller is configured to determine the presence or absence of physical interference of the main body and the interference permitter in the movement mode.

7. The handling system according to claim 4, wherein the controller is configured to permit the physical interference of the main body and the interference permitter in the holding mode.

8. The handling system according to claim 4, wherein the controller is configured to perform, in the intermediate mode:

positional control for controlling a motion of the holder to cause the holder to move to a target position and mechanical control for controlling a motion of the holder on the basis of a mechanical physical quantity acting on the holder.

9. The handling system according to claim 4, wherein the controller is configured to perform, in the movement mode, positional control for controlling the motion of the holder to cause the holder to move to the target position.

10. The handling system according to claim 4, wherein the controller is configured to perform, in the holding mode, mechanical control for controlling the motion of the holder on the basis of a mechanical physical quantity acting on the holder.

11. The handling system according to claim 4, wherein the controller is configured to:

set a movement speed of the holder to a first movement speed in the movement mode, and set the movement speed of the holder to a second movement speed lower than the first movement speed in the intermediate mode.

12. The handling system according to claim 11, wherein the controller is configured to set the movement speed of the holder to a third movement speed lower than the second movement speed in the holding mode.

13. An information processing system for generating a motion plan of a holder configured to hold the object and capable of a motion moving on a movement route, the holder being composed of a plurality of parts including a main body operable to hold an object and an interference permitter attached to the main body in a manner that allows displacement or deformation in response to physical interference, including contact or collision with others, the information processing system comprising a processor and a memory configured to store information of whether or not to permit physical interference of each of the plurality of parts of the holder, including contact or collision with others, in each segment of the movement route, wherein the holder is controlled on the basis of movement modes corresponding to segments on the movement route, and wherein the processor is configured to set whether or not to permit the physical interference of the plurality of parts of the holder for each segment corresponding to each movement mode, on the basis of the information of whether or not to permit the physical interference, to generate the motion plan of the holder.

14. An information processing system for generating a motion plan of a holder configured to hold the object and capable of a motion moving on a movement route, the holder being composed of a plurality of parts including a main body operable to hold an object and an interference permitter attached to the main body in a manner that allows displacement or deformation in response to physical interference, including contact or collision with others, the information processing system comprising:

a calculator configured to plan control content of the holder on the basis of a plan of a movement route of the holder; and a memory configured to store information of whether or not to permit physical interference of each of the plurality of parts of the holder, including contact or collision with others, in each segment of the movement route, wherein the holder is controlled on the basis of movement modes corresponding to segments on the movement route, and wherein the calculator is configured to set whether or not to permit the physical interference of the plurality of parts of the holder for each segment corresponding to each movement mode, on the basis of the information of whether or not to permit the physical interference, to generate the motion plan of the holder.

15. The information processing system according to claim 14, further comprising a plan preparer configured to generate models of the holder and the object, wherein the calculator plans a movement route for the model of the holder to hold the model of the object.

16. An information processing method to be executed by a processor of a computer, for generating a motion plan of a holder configured to hold the object and capable of a motion moving on a movement route, the holder being composed of a plurality of parts including a main body operable to hold an object and an interference permitter attached to the main body in a manner that allows displacement or deformation in response to physical interference, including contact or collision with others, wherein the holder is controlled on the basis of movement modes corresponding to segments on the movement route, the information processing method comprising an information acquiring step, a route planning step, and an interference determination step, wherein the information acquiring step includes acquiring information of whether or not to permit physical interference of each of the plurality of parts of the holder, including contact or collision with others, in each segment of the movement route, wherein the route planning step includes planning a movement route of the holder, and wherein the interference determination step includes setting whether or not to permit the physical interference of the plurality of parts of the holder for each segment corresponding to each movement mode, on the basis of the information of whether or not to permit the physical interference, to determine the physical interference of the holder.

17. A non-transitory computer-readable storage medium storing a program for causing a processor of a computer to execute an information processing method according to claim 16.

18. The handling system according to claim 4, wherein the controller is configured to:

plan a movement route of the holder, determine the presence or absence of physical interference of the holder on at least a part of the planned movement route, as to a specific segment included in the planned movement route, determine the presence or absence of physical interference of the main body and permit physical interference of the interference permitter, on the basis of the information of whether or not to permit the physical interference, on the basis of the information of whether or not to permit the physical interference, (i) determine the presence or absence of physical interference of the holder and the interference permitter, for the movement mode; (ii) determine the presence or absence of physical interference of the holder and permit physical interference of the interference permitter, for the intermediate mode; and (iii) permit physical interference of the holder and the interference permitter, for the holding mode, and generate a motion plan of the holder on the basis of a movement route on which there is no impermissible physical interference within the segments.

* * * * *